United States Patent [19]

Weiss et al.

[11] Patent Number: 5,740,266
[45] Date of Patent: Apr. 14, 1998

[54] IMAGE PROCESSING SYSTEM AND METHOD

[75] Inventors: Theodore F. Weiss, Quakertown, Pa.; Erwin Donath, Princeton, N.J.

[73] Assignee: Base Ten Systems, Inc., Trenton, N.J.

[21] Appl. No.: 227,947

[22] Filed: Apr. 15, 1994

[51] Int. Cl.$^6$ ..................................................... G06K 9/46
[52] U.S. Cl. ........................... 382/128; 382/199; 382/203; 382/256; 382/283; 128/661.05
[58] Field of Search ........................... 382/283, 282, 382/256, 257, 215, 131, 132, 199, 275, 128, 133, 173, 203; 358/453; 128/661.05, 661.02, 661.03, 660.07

[56] References Cited

U.S. PATENT DOCUMENTS

| | | | |
|---|---|---|---|
| 4,020,463 | 4/1977 | Himmel | 382/258 |
| 4,148,010 | 4/1979 | Shiau | 382/139 |
| 4,361,830 | 11/1982 | Homma et al. | 382/199 |
| 4,603,430 | 7/1986 | Sacks | 382/206 |
| 4,853,967 | 8/1989 | Mandeville | 382/259 |
| 5,091,967 | 2/1992 | Ohsawa | 382/283 |
| 5,202,933 | 4/1993 | Bloomberg | 382/283 |
| 5,257,182 | 10/1993 | Luck et al. | 382/133 |
| 5,347,588 | 9/1994 | Wilson | 382/257 |
| 5,383,135 | 1/1995 | Shofner et al. | 364/552 |
| 5,457,754 | 10/1995 | Han et al. | 382/257 |
| 5,528,703 | 6/1986 | Lee | 382/283 |

OTHER PUBLICATIONS

Klinger et al. "Segmentation of Echocardiographic Images Using Mathematical Morphology." IEEE Trans. On Biomedical Engineering. vol. 35, No. 11, pp. 925–934, Nov. 1988.

Belohlavek et al. "Utility of Image Enhancement Methods in Three–Dimensional Ultrasound Reconstruction." IEEE 1991 Ultrasonics Symposium Proceedings. vol. 2, pp. 1219–1222, Dec. 1991.

Gonzalez et al. *Digital Image Processing.* Addison–Wesley. 1992. pp. 483–497, 619–621.

Nakamura et al. "A Method for Extracting Feature Parts From CT–Images of Skull Based on State Transition Model." IEEE Pacific Rim Conference on Communications, vol. 2, pp. 589–593, May 1993.

Kapoor et al. "Lemon Sign: (A Case Report)" Indian J. Radiol. Imaging. pp. 399–400, 1989.

Levine. "Vision in Man and Machine." McGraw–Hill Book Co. 1985, pp. 480–504.

*Primary Examiner*—Joseph Mancuso
*Assistant Examiner*—Jon Chang
*Attorney, Agent, or Firm*—Sprung Kramer Schaefer & Briscoe

[57] ABSTRACT

A method and system for processing a digital image of an object comprises forming a single pixel image outline of the object in a digital image and producing a measure of the outline shape as a single number. In this way risk of spina bifida can be determined from an ultrasonic image of a fetal skull.

44 Claims, 20 Drawing Sheets

5,740,266

IMAGE PROCESSING SYSTEM AND METHOD

BACKGROUND OF THE INVENTION

The present invention relates to image processing, and in particular, to the processing of medical images for subsequent evaluation.

A number of techniques are currently available for the imaging of internal parts of the body, e.g., X-ray imaging, magnetic resonance imaging (MRI), ultrasonic imaging, computer aided tomography (CAT), positron emission tomography (PET), etc. In most cases, a "hard" copy of the image is produced and is directly evaluated by a clinician who, in some cases, may be required to evaluate the size or shape of an object in the image to determine an abnormality.

It has been found that it would be desirable to be able to evaluate the images automatically, particularly when the evaluation is one of size or shape.

However, in order to perform an automated evaluation, it is necessary to first obtain a faithful representation of the object to be evaluated from the image of the object. Many problems are encountered in this regard. For example, it is difficult to obtain a complete outline or representation of the desired object when part of the object consists of very low intensity portions of the image. Moreover, these images are by their nature filled with clutter or noise that interferes with the evaluation.

These problems associated with clutter elimination and outline processing are more complex than in the case of pattern recognition. In pattern recognition, one is required to detect an object that is selected from a finite set of predetermined and known shapes. In the case of medical imaging, although the general shape or size of the target object, i.e., a fetal skull or an ovary, in the medical image is known, the precise characteristics are virtually infinite in possibilities and are, therefore, unknown. In fact, since it often is the variation in size or shape that is being evaluated, the act of generalizing the shape would result in the loss of information. Therefore, it is necessary to process and enhance the image to determine the accurate size or shape of the actual object.

SUMMARY OF THE INVENTION

The main object of the present invention is to provide a method and a system which overcomes the problems encountered in image processing.

Another object of the present invention is to remove clutter by the use of masks.

Still another object of the present invention is to remove clutter by filtering using a band pass filter to emphasize the target object and suppress clutter.

A further object of the present invention is to use filtering which creates a clutter free channel around a target object to facilitate masking.

A still further object of the present invention is to remove clutter by iteratively changing the shape of a mask to form a suitable single pixel outline of the imaged object.

Another object of the present invention is to evaluate the shape of an outline formed by image processing by determination of the curvature of the shape.

Still another object of the present invention is to measure characteristics of curvature of an object shape and characterize the shape with a single number.

A further object of the present invention is to evaluate an outline shape by reducing the shape of an object to single number and compare it to statistical populations.

These and other objects of the present invention are achieved in accordance with the present invention by the method and system for image processing wherein a single pixel image outline of an object in a digital image is formed and a measure of the outline shape as a single number is produced.

In another embodiment the method and system form a single pixel image outline by a) superimposing a mask over edges of the object to crop away image portions outside the mask;

b) forming a first single pixel outline from the remaining image portions;

c) creating a new mask from the first single pixel outline;

d) superimposing the new mask over edges of the object in the image to crop away image portions outside the mask;

e) forming a second single pixel outline from the remaining image portions;

f) comparing the second outline to the first outline for changes; and g) repeating steps c) to f) until the changes are below a preselected number.

In a further embodiment, the method and system form a single pixel outline from remaining image portions by dilating the remaining image portions to form a closed outline and shrinking the dilated image to a single pixel outline.

In still another embodiment, the method and system form a single pixel image outline by:

applying an oversized mask over edges of the object image;

incrementally shrinking the mask and counting the number of pixels uncovered thereby;

selecting a mask having the minimum pixel count change; and superimposing the selected mask on the object to crop the object.

Furthermore, the cropped object is dilated to form a closed outline and is then shrunk to a single pixel outline.

In a further embodiment, the method and system enhance the image prior to forming a single pixel outline by:

applying a band pass filter to the digital image of the object having an expected thickness range to remove image portions having pixel thicknesses above and below the expected thickness range; and edge detecting the remaining image portions to produce an outline of the object.

The band pass filter is preferably underdamped to produce an overshoot and thereby a clear area around remaining image portions.

In a still further embodiment, the method and system produce a measure by measuring the radius of curvature of the outline at a plurality of sampling points, transforming the radius of curvature values to curvature values which are the inverse thereof;

plotting the curvature values;

computing the area of the plot of curvature values below a predetermined threshhold value; and assigning the computed area as a figure of merit for the outline.

The figure of merit is preferably compared to at least one distribution of figures of merit to determine a characteristic of the outline.

In a preferred embodiment of the present invention, the method and system is used for processing an ultrasonic image of a fetal skull to determine the probability of spina bifida by a) marking four points on a fetal skull image corresponding to intersections with major and minor axes of an ellipse;

b) applying a band pass filter to the fetal skull image having an expected thickness range to remove image portions having pixel thicknesses above and below the expected thickness range;

c) edge detecting the remaining image portions to produce an outline of the fetal skull;

d) applying an oversized elliptical mask over edges of the fetal skull image aligned with the four points;

e) incrementally shrinking the mask and counting the number of pixels uncovered thereby;

f) selecting a mask having the minimum pixel count change;

g) superimposing the selected mask on the fetal skull image to crop same;

h) dilating the cropped fetal skull image to form a closed outline and shrinking the closed outline to a single pixel outline;

i) dilating the single pixel outline to form a new elliptical mask;

j) superimposing the new mask over edges of the fetal skull image to crop away image portions outside the mask;

k) forming a second single pixel outline from the remaining image portions;

l) comparing the second outline to the first outline for changes;

m) repeating steps i) to l) until the changes are below a preselected number; and n) producing a measure of the outline shape as a single number.

The forming of a single pixel outline from remaining image portions comprises dilating the remaining image portions to form a closed outline and shrinking the dilated image to a single pixel outline.

The production of a measure comprises measuring the radius of curvature of the outline at a plurality of sampling points, transforming the radius of curvature values to curvature values which are the inverse thereof;

plotting the curvature values;

computing the area of the plot of curvature values below a predetermined threshhold value; and assigning the computed area as a figure of merit for the outline.

The figure of merit is compared to at least one distribution of figures of merit to determine risk of spina bifida.

With regard to the filtering of the image, the general size and shape of the target object can be used to design a two dimensional filter that is used to enhance the image. In a particularly advantageous embodiment of the present invention, the filter is a band pass filter that can emphasize the desired object while suppressing objects, clutter and noise that is larger or smaller than the desired object. This approach facilitates the isolation of the desired or target object without modifying its size or shape.

A specific application of this technique is used in the isolation of a fetal skull outline from an ultrasonic image. The shape of the skull outline is a known indicator of spina bifida. Therefore, in order to automate the detection of spina bifida, it is necessary to enhance the ultrasonic image so that a determination of the shape of the skull can be made for subsequent evaluation.

The image is first enhanced by filtering, but clutter still remains in the object. Thus, the preprocessing of the image does not totally eliminate the clutter and other approaches are required.

In accordance with the invention, the next step in image processing is the generation of a mask that approximates the shape of the desired object and to use the mask to operate on the image to crop away clutter while retaining the desired portions of the image.

In the aforementioned application wherein one isolates the image of a fetal skull outline, the shape of the skull is approximately an ellipse. An elliptical mask, which overlaps the outline of the fetal skull image, can then be used to crop away clutter. The mask has its size and location adjusted so that it encompasses the skull portion of the image and minimizes the inclusion of undesired portions of the image.

In some fetal skull images, it is common to include markers at the end points of the major and minor axes of the skull. These four points define a unique ellipse which can be advantageously used to form the mask. The thickness of the mask is determined empirically by reviewing many images of skulls.

When the thickness of the mask is adjusted to be large enough to encompass all skull shapes, it may still allow some residual clutter. In accordance with the invention, the clutter objects in the image can be eliminated. In the case of skull images, the clutter tends to be smaller than the skull image and therefore size discrimination can be used to isolate the skull from the clutter.

Moreover, because the skull portion of the image is the densest and thus highest intensity portion of the image, this is used to help size and locate the mask. Correlation is used to locate an oversize mask over the skull and then the mask is decremented in size while recording the mass of the image which is uncovered after each decrement. As the mask uncovers part of the skull, the slope of the mass uncovered will increase thus detecting the edge of the skull. The size reduction of the mask can be further enhanced by allowing non-uniform reduction which allows departures from the original mask shape.

In a particularly advantageous embodiment of the present invention, clutter removal is enhanced by a multiple stage process that uses a different mask for each stage.

This clutter removal in accordance with the present invention comprises a multi-stage process that uses a mask for each stage that is a better estimate of the target object than a previous mask. An initial or rough mask is based on the composite shape of a large quantity of images. The rough mask is used to remove clutter and create an initial outline. Because the rough mask does not completely remove all of the clutter, the initial outline shape is somewhat affected by the clutter. However, the initial outline is a better estimate of the actual shape of the object being analyzed than was the rough mask. Thus, the initial outline can be used to create a second mask, and because this second mask is a better fit to the imaged object than that of the rough mask, it will be more effective in removing clutter.

Similarly, the outline from the second iteration can be used to produce an even better mask for a third iteration and so on. A comparison is made between each outline to make a decision when the process is no longer producing shape changes of any significance.

In accordance with another object of the present invention, when using the adaptive masking approach to remove clutter, the process can be enhanced and made more effective, if there is a small, clear area around the target object that is free of clutter. This clear area allows the mask to overlap the target object without including clutter.

This can be achieved in accordance with the present invention by designing the band pass filter, in addition to controlling the cut-off frequencies, to adjust the damping factor to create a filter with a special desirable characteristic wherein the filter is under damped to thereby produce an overshoot in the response characteristic. This overshoot produces the desired clear area around the target object.

Further in accordance with the present invention, the method and system utilizes techniques for evaluating the resulting image processed outline shape to determine if there is an abnormality.

In medical testing, it is common practice to compute an estimate of the probability of being affected with a disorder when the test does not have a 100% detection rate and a 0% false positive rate. Typically, a test produces a single numerical value and this value is compared to probability distributions of the measured parameter for affected and unaffected populations. The probability of being affected is computed from the relative frequency of occurrence of the measured value in the affected and unaffected populations.

In order to use this risk assessment technique to evaluate the shape of an object in a medical image in accordance with the present invention, a single numerical value that characterizes the shape of the desired object is produced.

This is done in the present invention by the use of radius of curvature which produces a measurement of the shape of the outline of an object. The process involves determining the radius of curvature for each point on the outline and making an evaluation thereof. The radius of curvature is a good measure of the shape of a curve at each discrete point. To characterize the shape of the curve as a whole, all of the radius of curvature values from the entire curve are evaluated.

The radius of curvature function is not well behaved as the curve changes from a convex to a concave segment. At such transitions, the radius of curvature passes through positive infinity to negative infinity. Applying a transform to the radius of curvature function can correct this problem. Taking the inverse of the radius of curvature, produces a well behaved function that is called, for the purposes of this invention, curvature.

After the curvature has been computed for each point on an object outline, the curvature values can be processed to produce a single numerical value that characterizes the degree to which a particular shape characteristic is present in the curve or outline.

In the application of this technique to the detection of spina bifida from a fetal skull outline, the normal skull outline is fairly regular with generally positive radii of curvature throughout. Irregular skulls with negative radii of curvature may indicate spina bifida. The extent of the negative radius of curvature is an indicator of the probability of being affected.

These and other features and advantages of the present invention will be disclosed in the following detailed description of the invention taken with the attached drawings wherein:

DETAILED DESCRIPTION OF THE INVENTION

Figure 1:
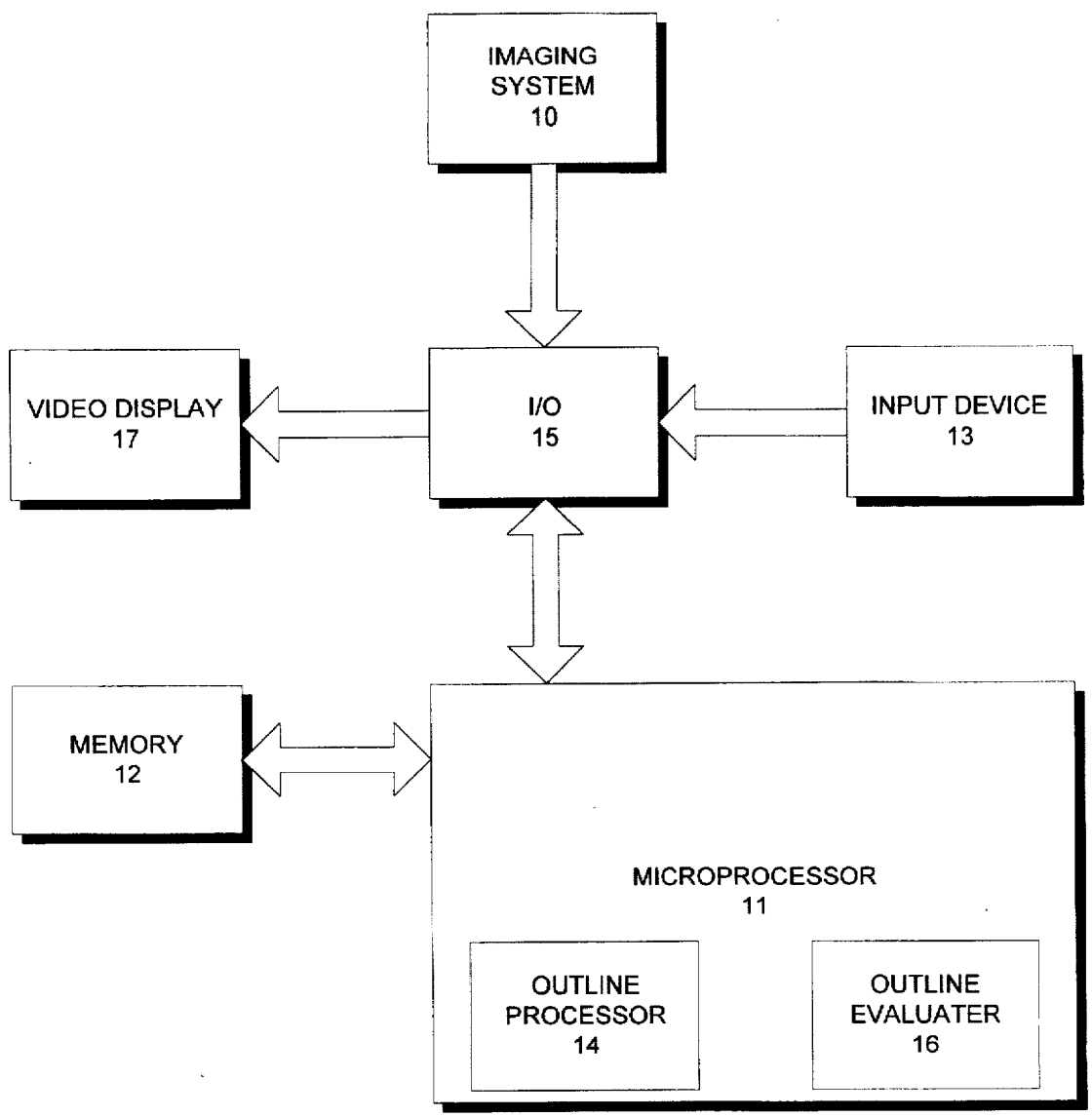
FIG. 1 is a block diagram of the imaging system according to the present invention.

FIG. 1 shows the image processing system according to the present invention. As shown in FIG. 1, an imaging system 10, which can be any conventional imaging system which produces a digital image, such as an ultrasonic imaging system, an MRI scanning system, a CAT scanning system, a PET scanning system or an X-ray imaging system.

The digital image is received by an input/output device 15 which includes a frame grabber or other conventional video image capture circuit. The I/O 15 also receives input data from an input device 13 which can be a keyboard, mouse or other input device and the I/O 15 applies image data to a video display 15 which is preferably a computer monitor. The I/O 15 also communicates with microprocessor 11 which receives the image data from the imaging system 10 and data from the input device 13 for processing the data as will be described hereinafter.

Microprocessor 11 stores data in a memory 12 and includes an outline processor 14 which processes image data to produce an outline, as will be described hereinafter and includes an outline evaluator 16 which evaluates the outline as will also be described hereinafter.

In one preferred embodiment of the present invention, the I/O 15, memory 12 and microprocessor 11 are part of a microcomputer system, in particular the Apple Macintosh Quadra 650 microcomputer programmed with MATLAB 4.1 by Math Works Inc., and the outline processor and evaluator are part of the standard microprocessor. Other microcomputers such as those based on the Intel 486 or Intel Pentium processor can also be used for the system shown in FIG. 1.

Figure 2:
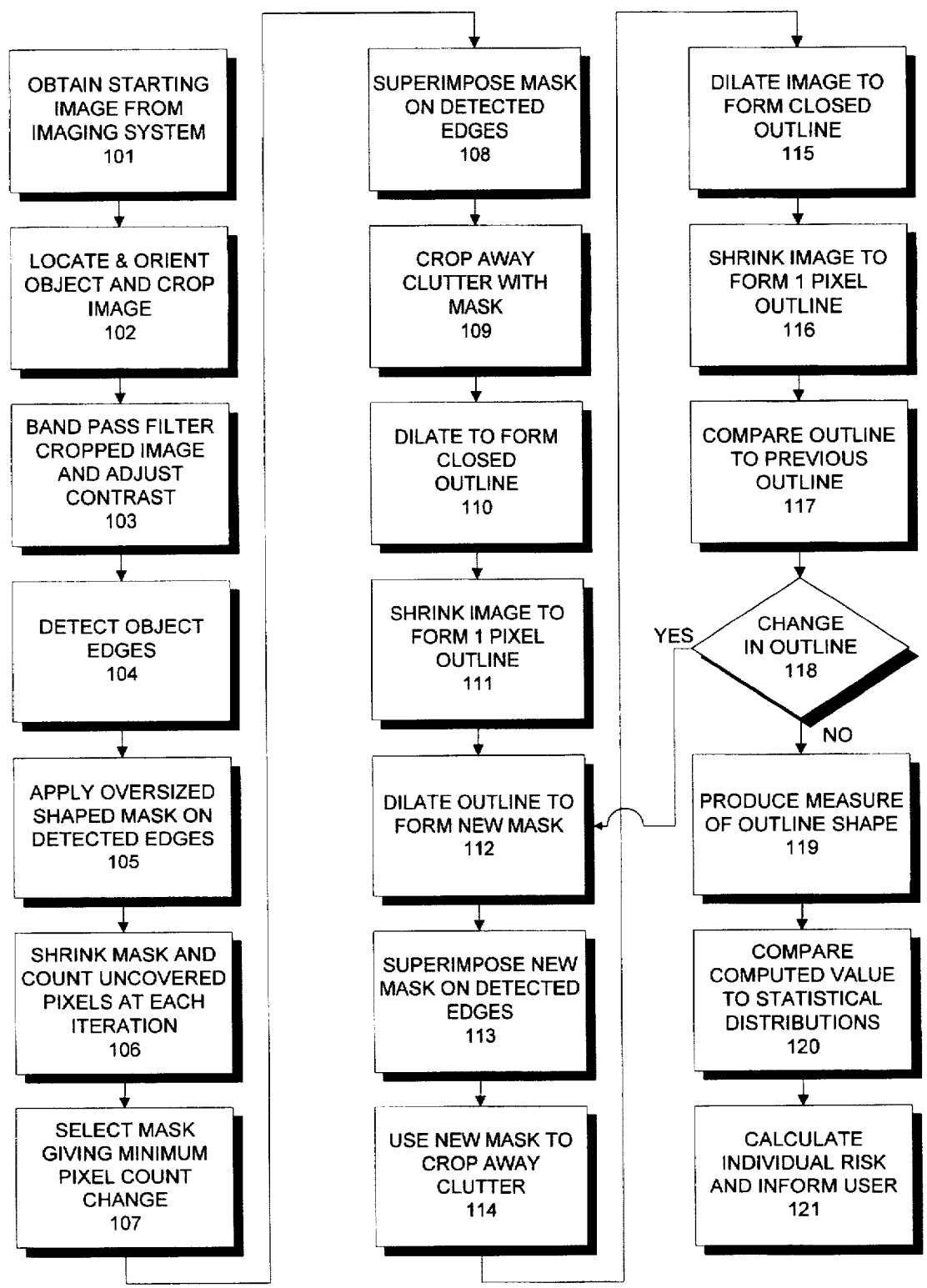
FIG. 2 is a flow chart of the image processing method according to the present invention carried out in the system of FIG. 1.

FIG. 2 is a flow chart of the method carried out by the system of FIG. 1 in accordance with the present invention. The method steps 101–121 shown in FIG. 2 are explained with reference to FIGS. 3–28. Although the system and method of the present invention are described with reference to an ultrasonic image of a fetal skull for the evaluation of whether the fetus is affected with spina bifida, the present invention can be used with images created from other imaging systems and for evaluating objects other than a skull in order to make a determination of disorders other than for spina bifida. Moreover, the imaging techniques described hereinafter can be used for processing images for other purposes where the original images have substantial clutter and there is a requirement to obtain a faithful outline of an imaged object.

Figure 8:
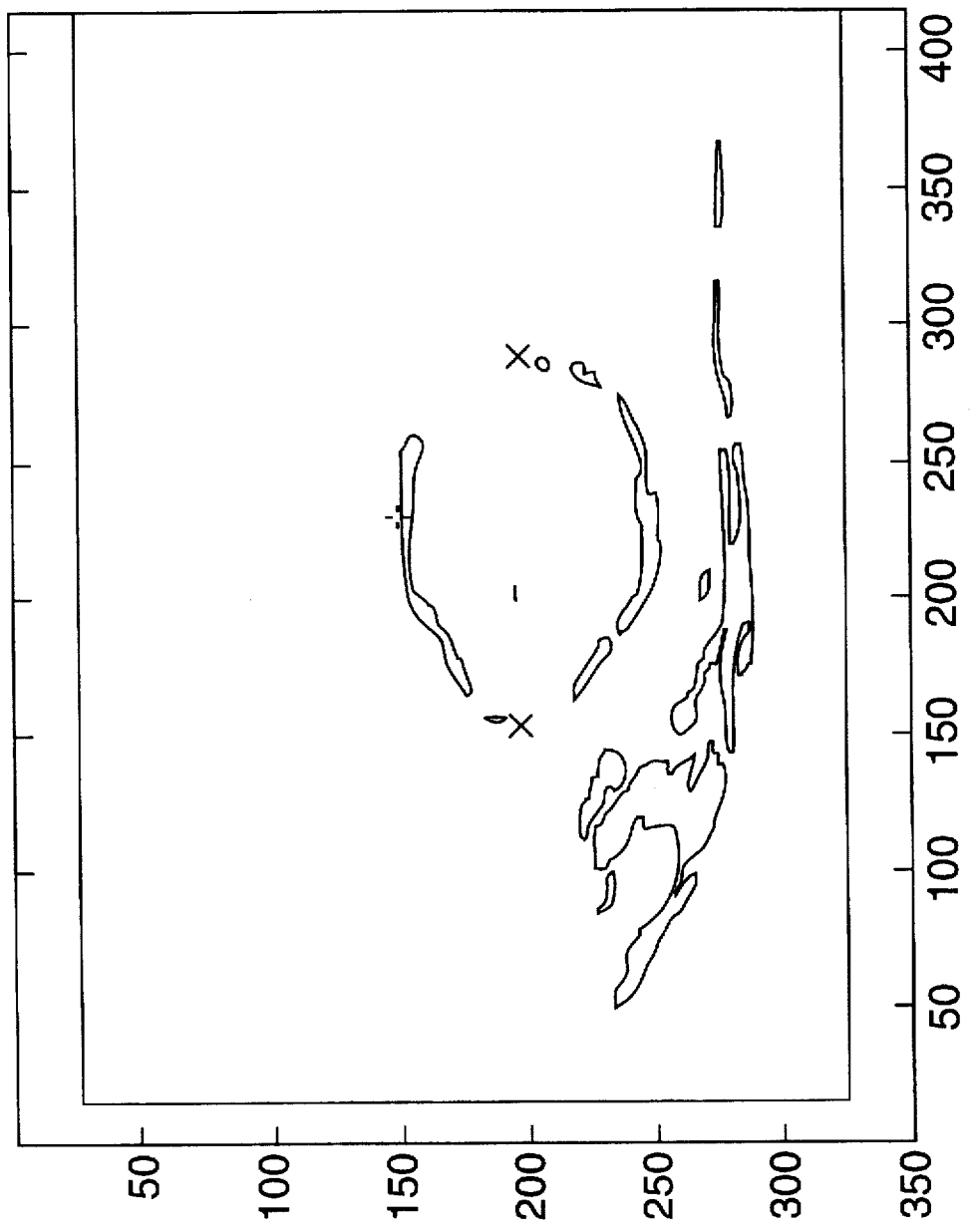
FIG. 8 is an ultrasonic image of a fetal skull along with the associated clutter.

In the first step 101, a starting image is obtained from imaging system 10 and such an image is shown in FIG. 8. The digitized image of FIG. 8 includes the image of a fetal skull as well as considerable noise and clutter. Imaging systems which produce ultrasonic images such as that shown in FIG. 8 include means for placing marks at the intersection of the major and minor axes with the skull image in order to locate the object to be analyzed. In situations where the starting image from the imaging system 10 does not have such marks, the present invention utilizes the input device 13 which is ideally a mouse or other graphic input device for placing marks on the digitized image displayed in video display 15.

Figure 9:
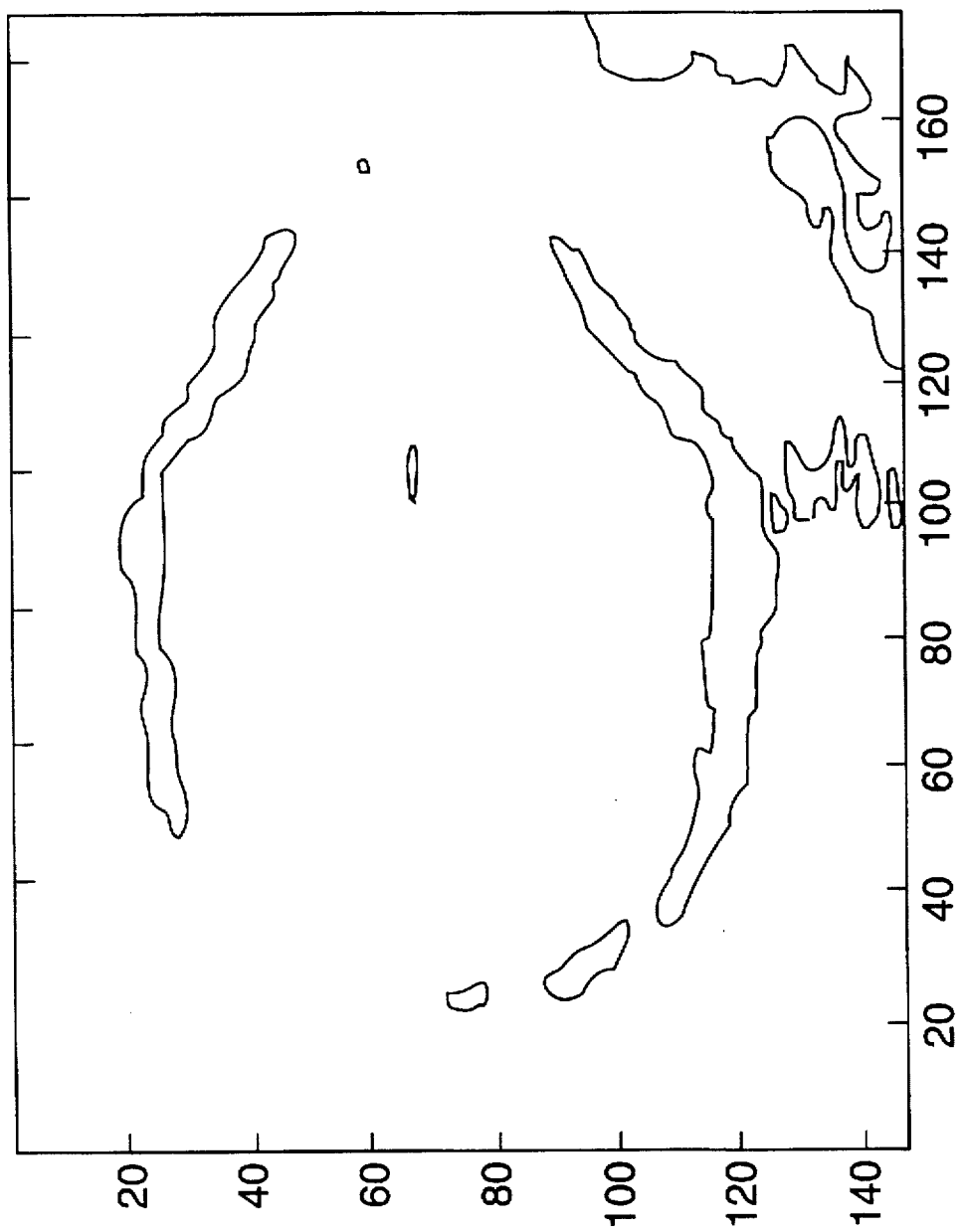
FIG. 9 shows the image of FIG. 8 oriented and cropped to the desired object.

Based upon the marks in the image of FIG. 8, the microprocessor 11 locates and orients the object and crops the image in step 102 as illustrated in FIG. 9.

Figure 10:
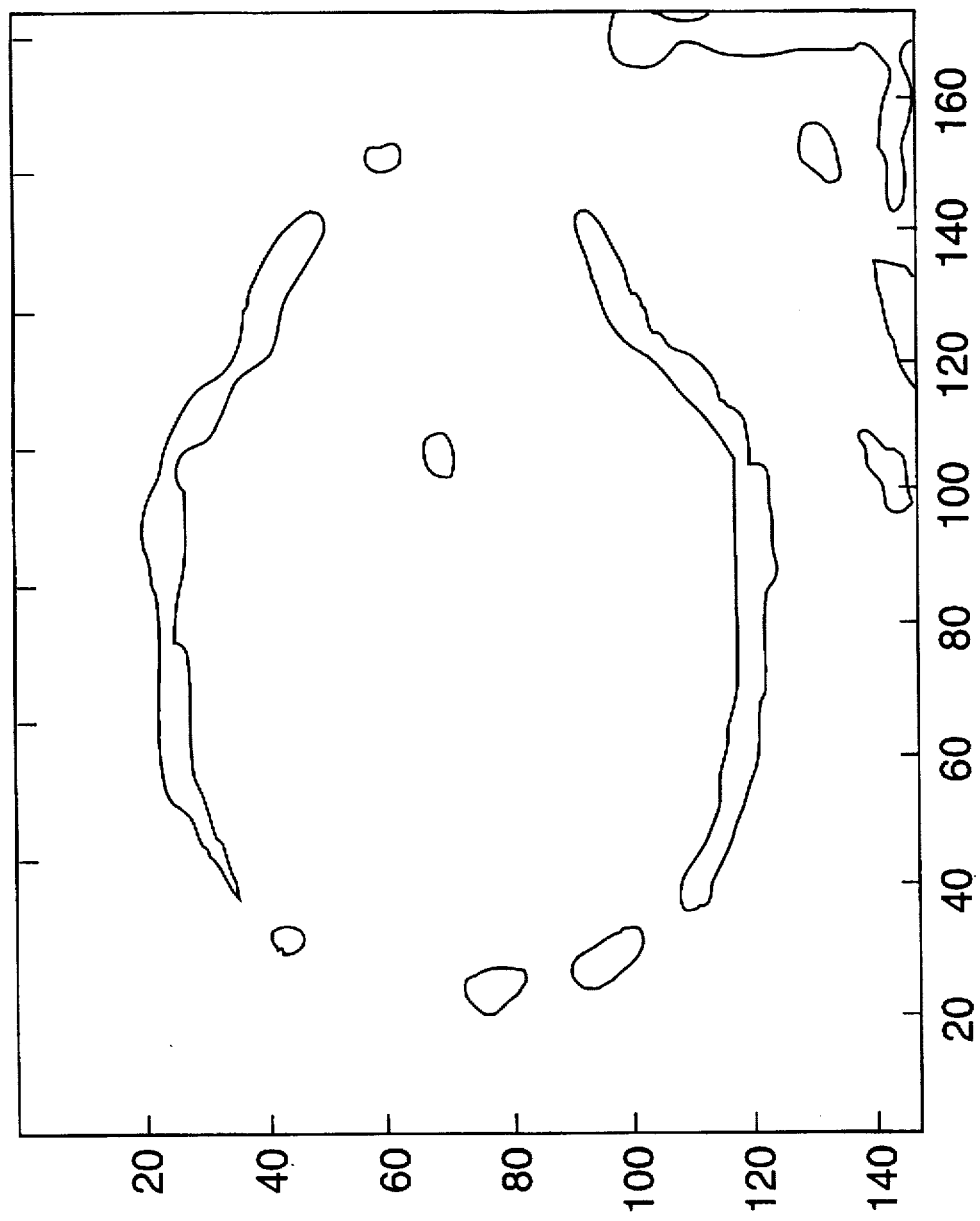
FIG. 10 shows the image of FIG. 9 which has been filtered with a band pass filter in accordance with the present invention.

In order to enhance the image for further processing, the outline processor 14 applies a band pass filter to the cropped image in step 103 and adjusts the contrast thereof to obtain the image shown in FIG. 10.

Figure 3:
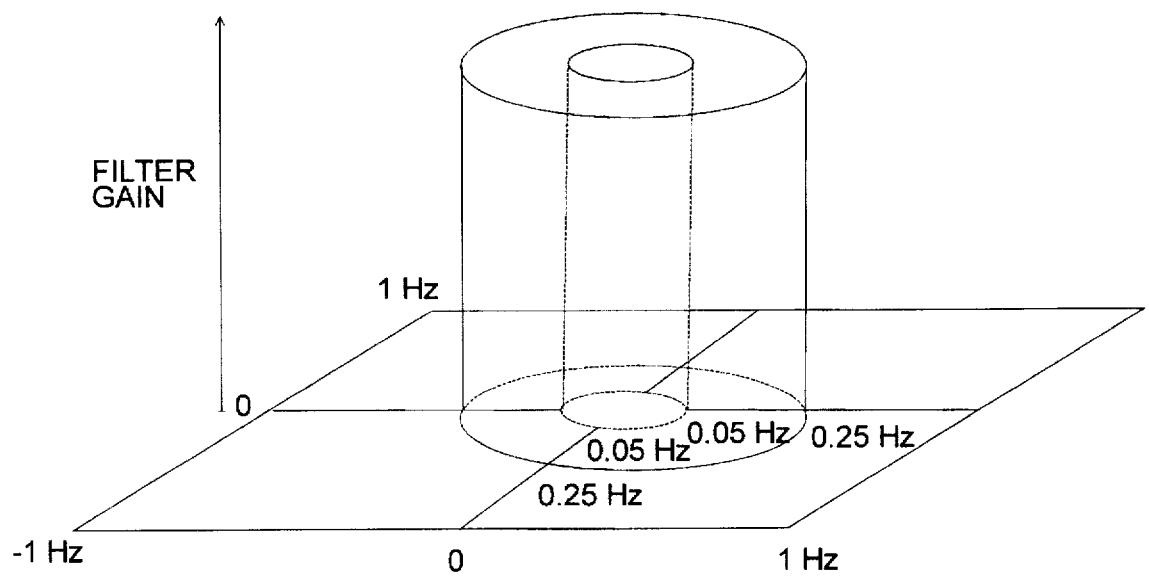
FIG. 3 is a graphical representation of the filtering according to the present invention.

For the case of the processing of an ultrasonic image of a fetal skull, the range of skull thicknesses is, for example in a particular imaging system, 7–17 pixels. Since the filter frequency/gain function must have a finite slope and it is desirable to avoid attenuating the skull image, a pass band of 4–20 pixels is used to design the filter. It is more common to describe a filter's characteristics in terms of frequency, which is the inverse of spatial distance. Specifically, 4 pixels maps into a frequency of $¼=0.25$ Hz and 20 pixels maps into a frequency of $1/20=0.05$ Hz. Therefore, the filter pass band is 0.05 to 0.25 Hz. A graphical representation of the this two dimensional band pass filter is shown in FIG. 3 where frequency is plotted versus filter gain. The band pass filter is available as the tool "filter2" in MATLAB 4.1.

The band pass filtering described above can be further enhanced and made more effective by creating a small clear area around the target object that is free of clutter.

Figure 4:
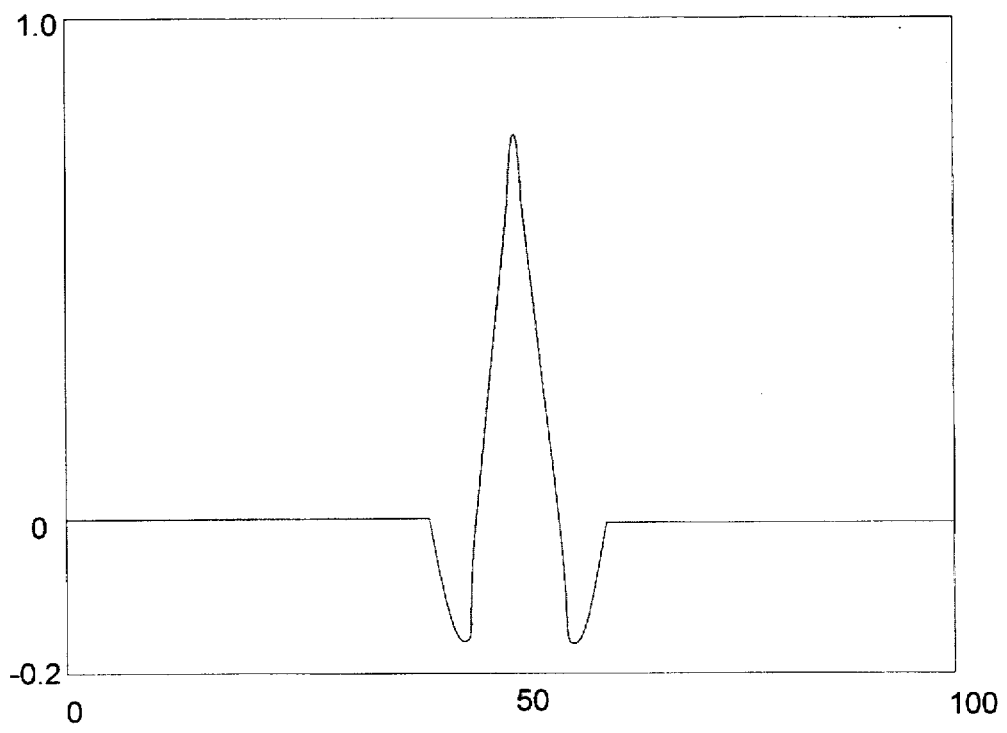
FIG. 4 is a graphical representation of the filter characteristic according to the present invention.

As shown in FIG. 4, the band pass filter is designed to control the cutoff frequencies and the damping factor is adjusted to create a filter with an overshoot in its response characteristic as indicated by the portion of the curve going below zero in FIG. 4. This is achieved by underdamping the response characteristic of the filter. The result of this filtering function is shown in FIG. 10 where the image of the skull has the clear black area surrounding the enhanced skull portion.

Figure 11:
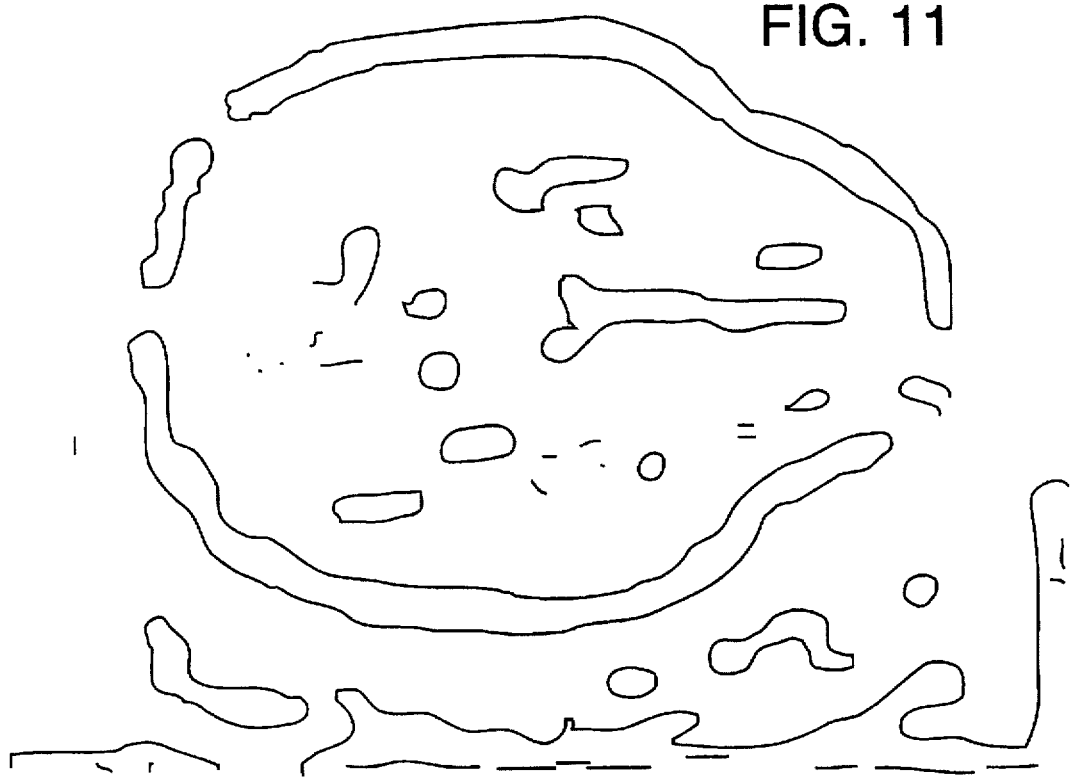
FIG. 11 shows an edge detected image from FIG. 10.

After adjusting the contrast of the image so that the resulting image shown in FIG. 10 is achieved, the outline processor in step 104 computes the intensity gradient of the image and uses a threshold detector to detect the object edges to obtain the image shown in FIG. 11. This detector is available as the tool "edge" in MATLAB 4.1 and in particular using the "sobel" derivative method.

Figure 12:
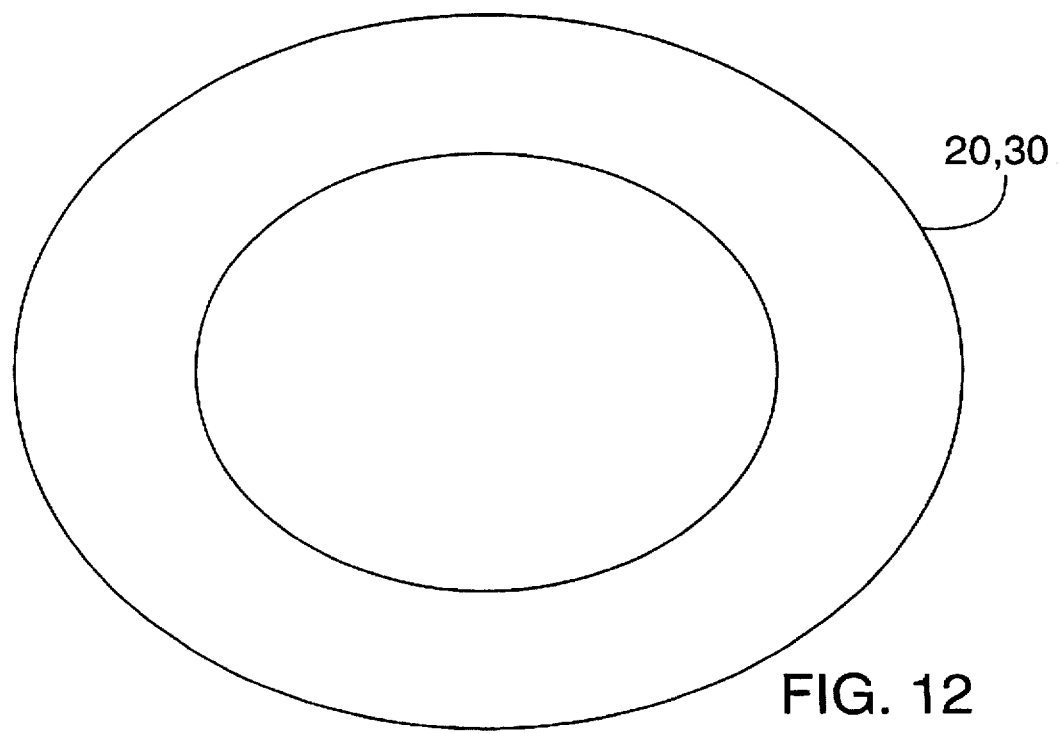
FIG. 12 is an oversized elliptical mask constructed from marks on the image of FIG. 8.

In step 105, an oversized shaped mask shown in FIG. 12 is applied on the detected edges of FIG. 11. This mask is explained in more detail in FIGS. 5 and 6.

Figure 5:
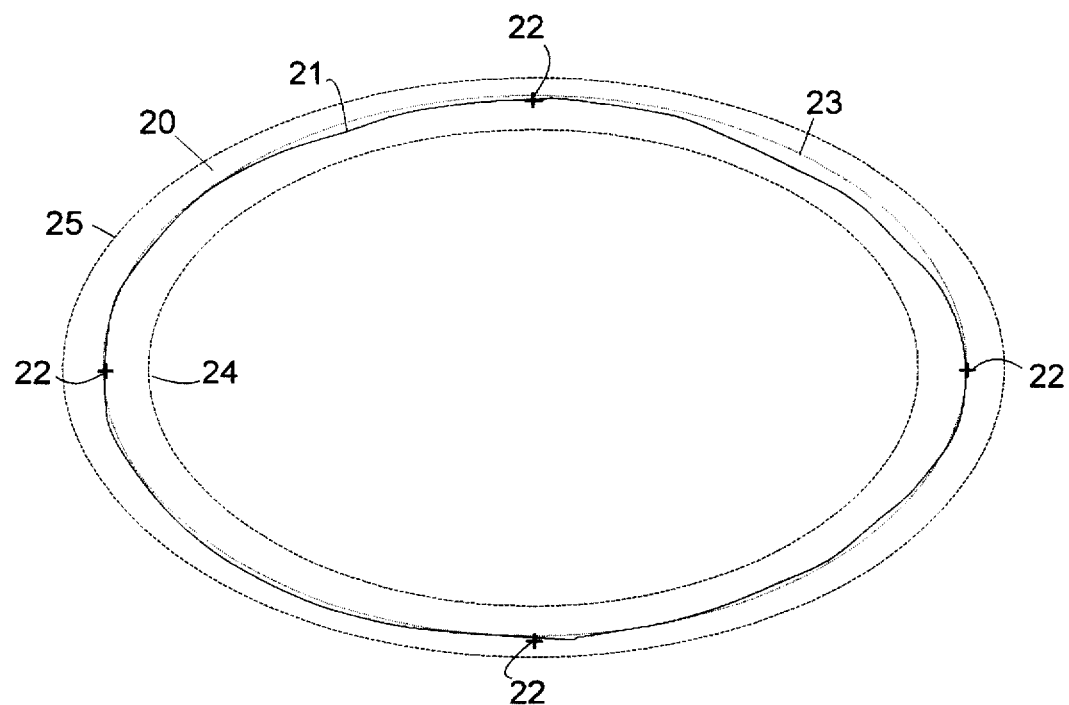
FIG. 5 shows the use of a mask for cropping a desired image of an unaffected fetal skull.

As shown in FIG. 5, the simplified image of a skull 21 which is unaffected by spina bifida is shown with marks 22 in place. Marks 22 define a unique ellipse 23 which is shown by dotted lines in FIG. 5. Based upon ellipse 23, inner and outer elliptical bands 24 and 25 are computed, the distance between which is based upon empirical data from viewing a large number of original images.

Figure 6:
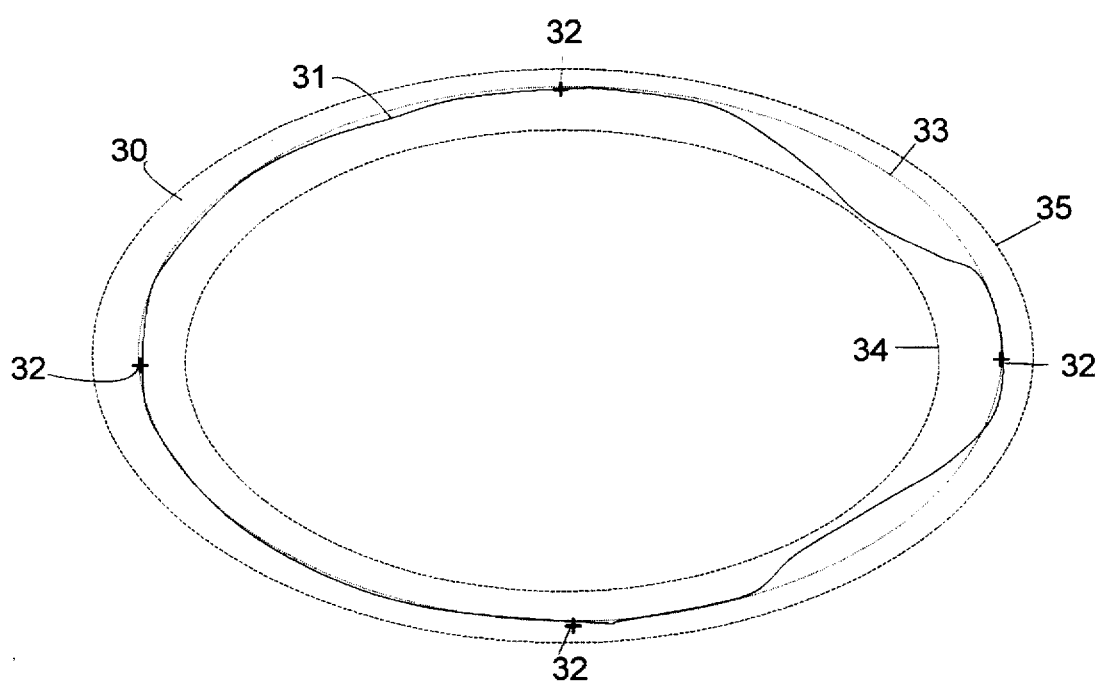
FIG. 6 shows the use of a mask for cropping image of a fetal skull affected with spina bifida.

FIG. 6 shows similar structure for a skull outline 31 of a spina bifida affected fetus. The marks 32 define ellipse 33 which determines inner and outer mask edges 34 and 35.

Figure 13:
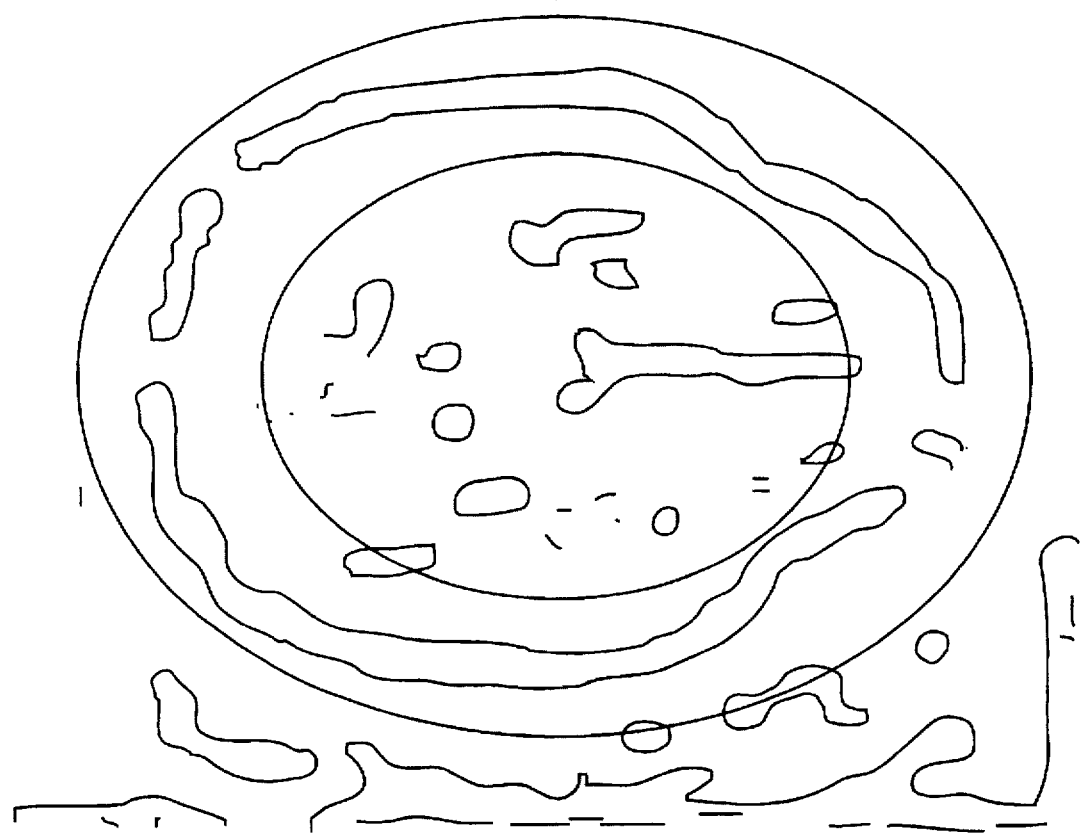
FIG. 13 is the mask of FIG. 12 superimposed on the image of FIG. 11.
Figure 14:
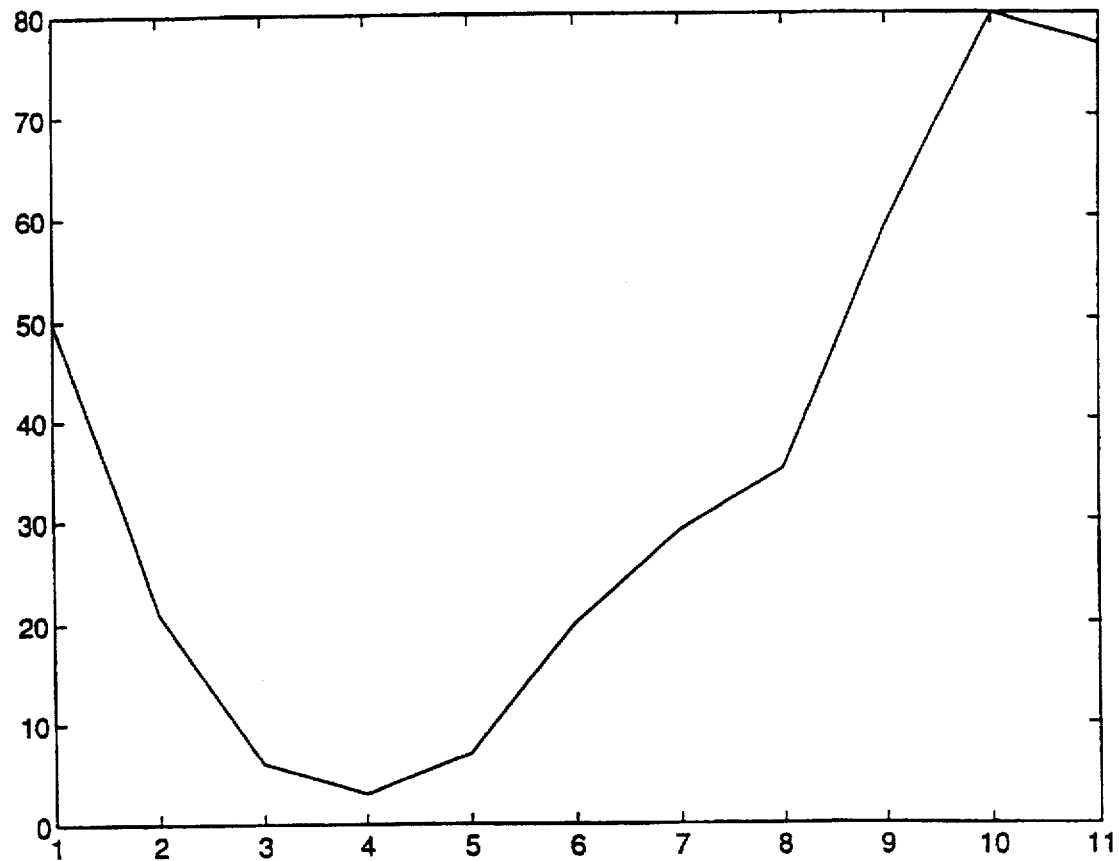
FIG. 14 shows the pixel count for each shrinkage of the mask of FIG. 12.
Figure 15:
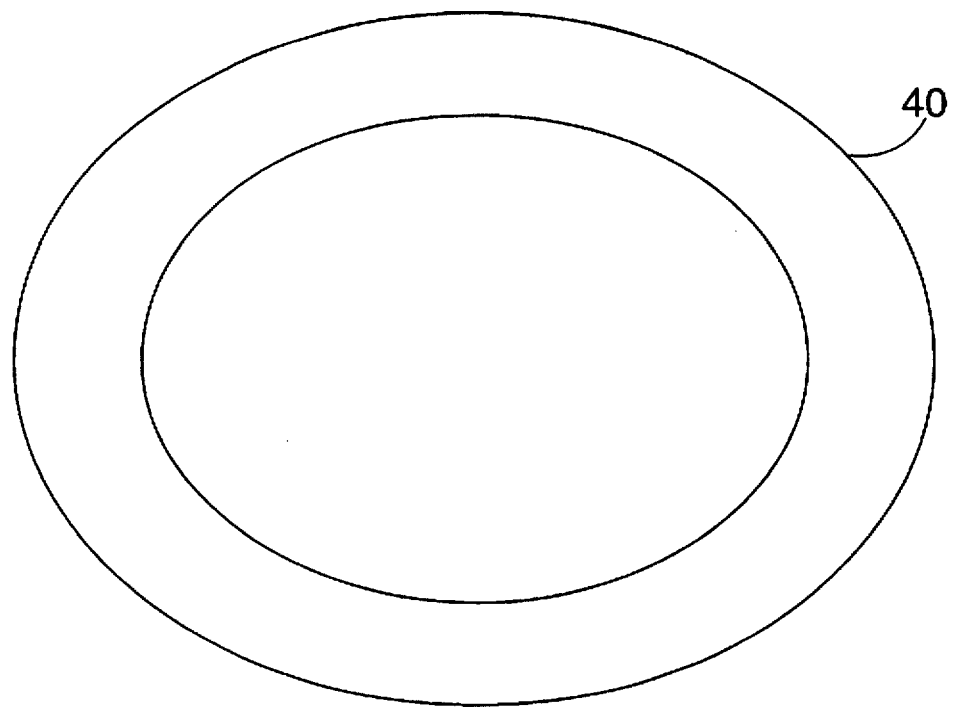
FIG. 15 shows the selected mask after shrinkage.
Figure 16:
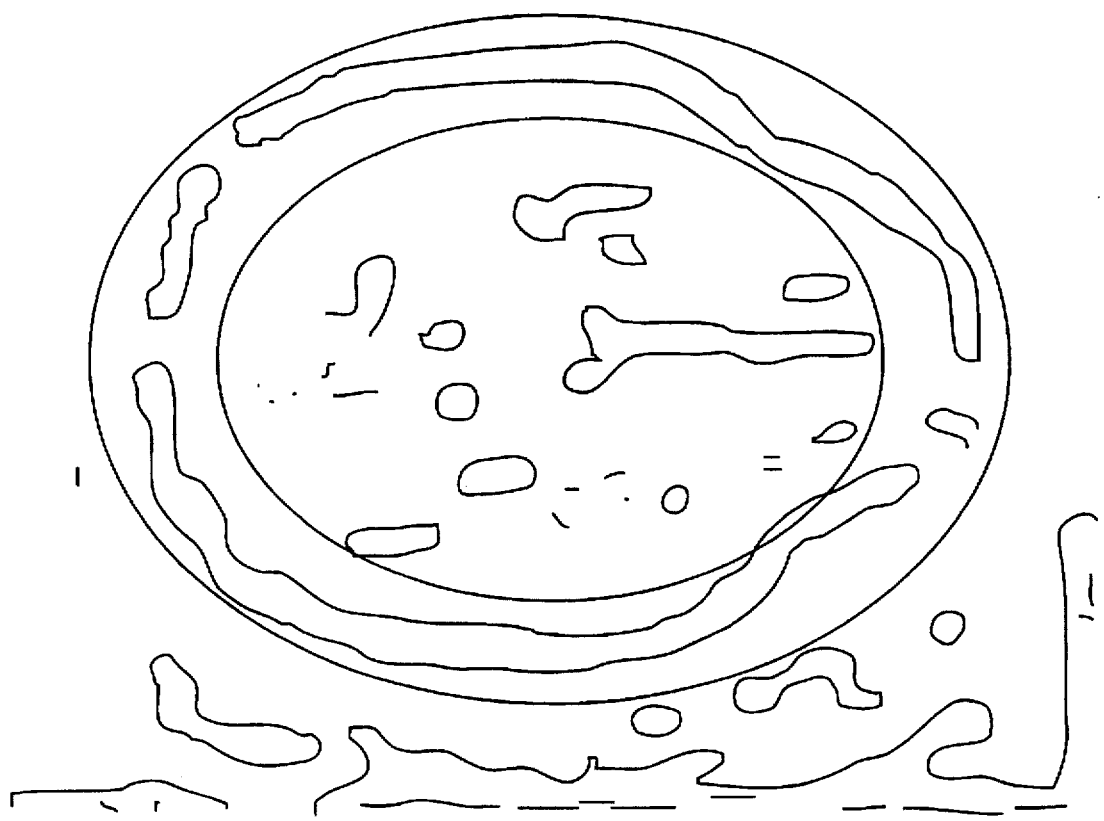
FIG. 16 shows the mask of FIG. 15 superimposed on the image of FIG. 11.

The resulting elliptical mask 20 or 30 is shown in FIG. 12 and is superimposed on the edge detected image in FIG. 13 using the marks for alignment. The mask 20, 30 is now shrunk in step 106 and the outline processor counts the number of pixels which are uncovered at each iteration, as is illustrated in the graph of FIG. 14 which shows number of uncovered pixels versus iteration. From the data obtained in FIG. 14, in step 107 the mask having the minimum pixel count change, which is shown as the mask obtained in iteration 4, is selected and is shown in FIG. 15 as mask 40. Mask 40 is superimposed on the detected edges in step 108, and this achieves a cropping of the clutter to obtain in step 109 the resulting cropped image shown in FIG. 17.

Figure 17:
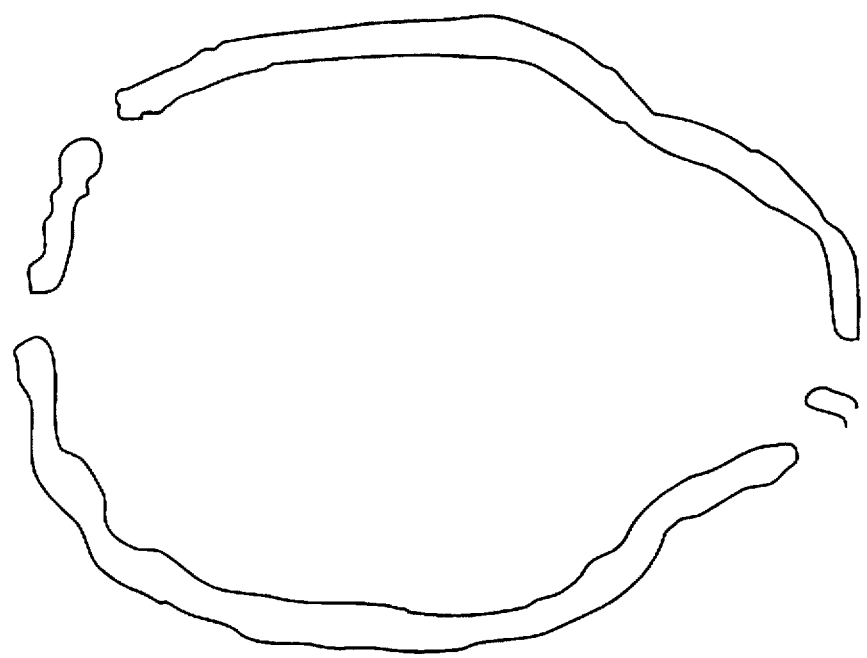
FIG. 17 shows the resulting cropped image from FIG. 16.
Figure 18:
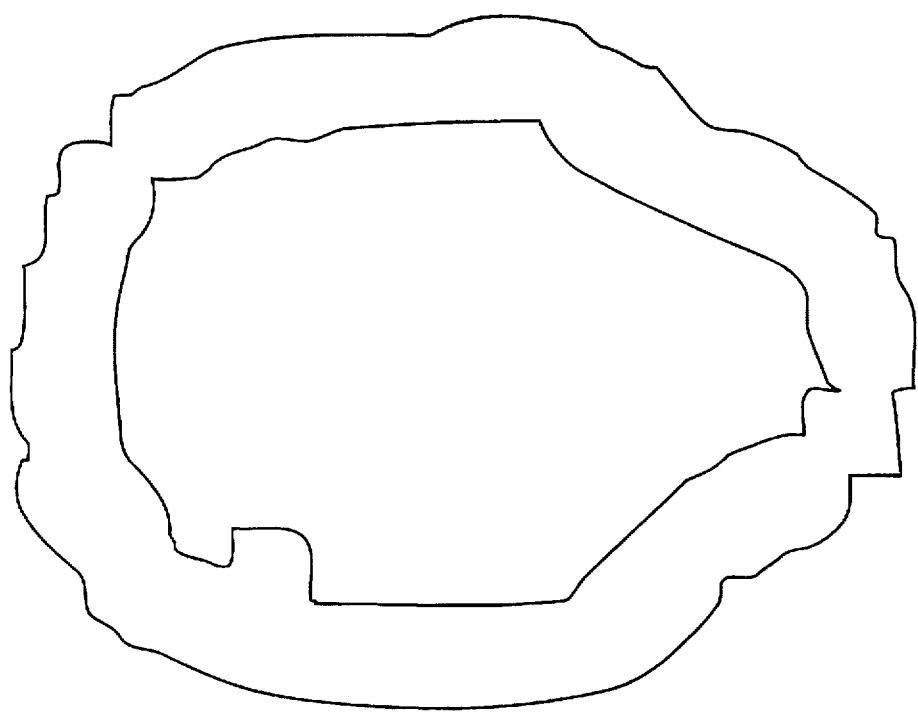
FIG. 18 shows the dilated image from FIG. 17.
Figure 19:
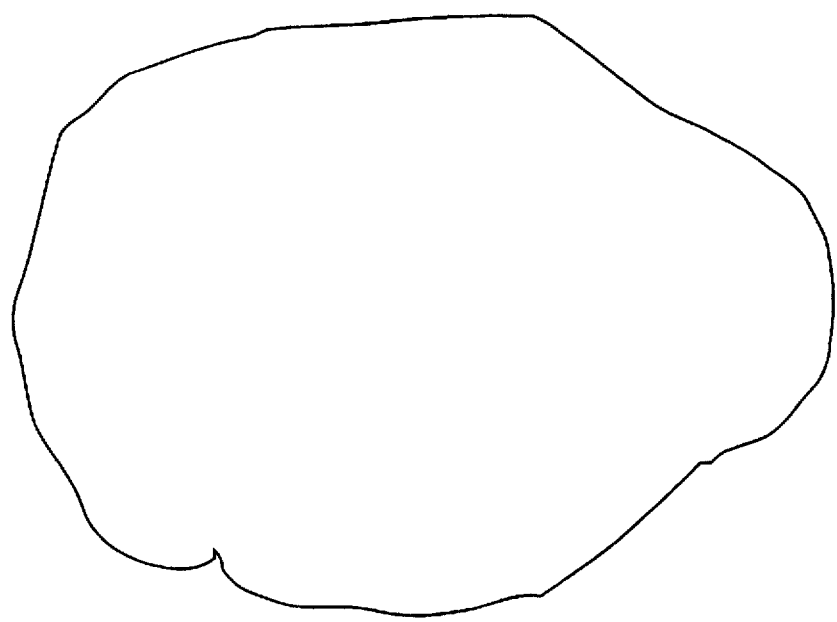
FIG. 19 shows single pixel outline formed from shrinking image of FIG. 18.

The outline processor proceeds in step 110 to dilate the image of FIG. 17 to form a closed outline shown in FIG. 18 and this dilated image is shrunk in step 111 to a one pixel outline to form the outline shown in FIG. 19.

Figure 20:
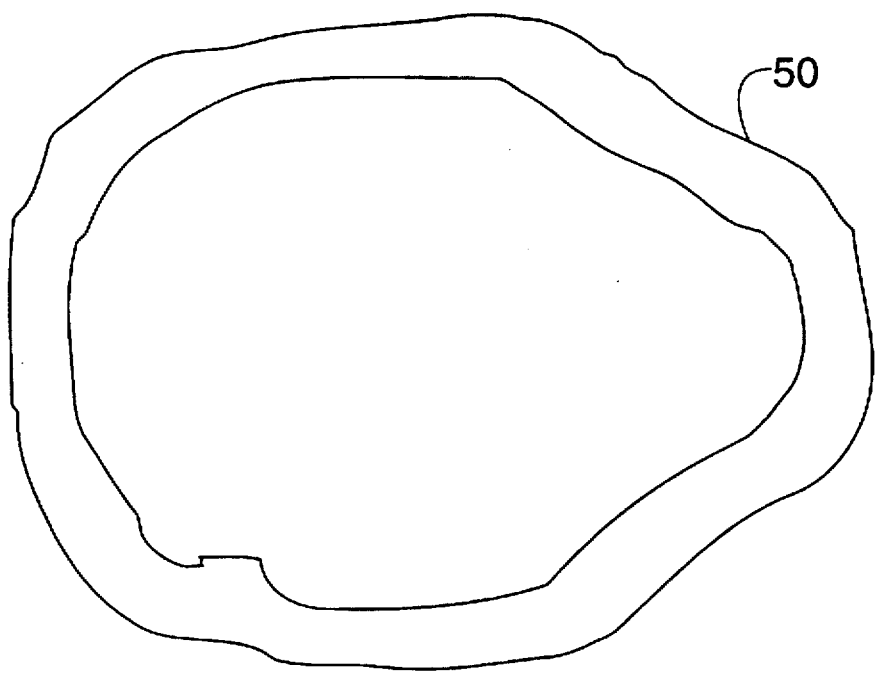
FIG. 20 shows new mask formed from outline of FIG. 19.
Figure 21:
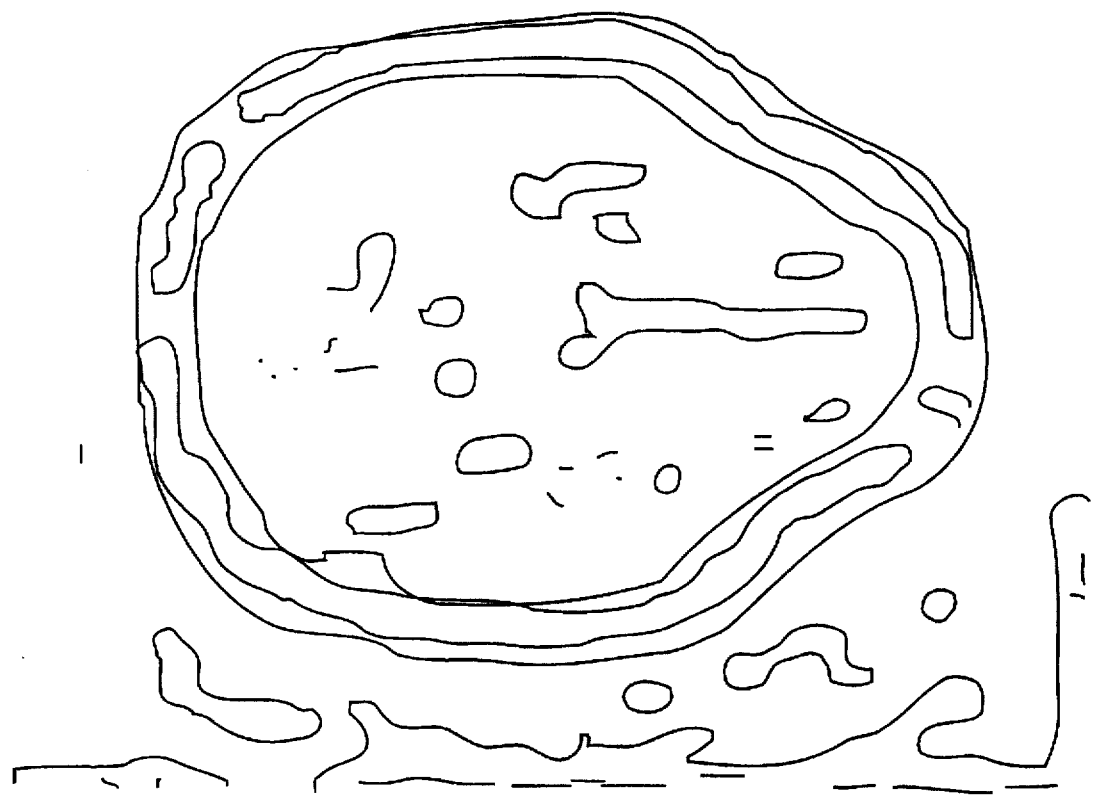
FIG. 21 shows new mask of FIG. 20 superimposed on image of FIG. 11.

The outline shown in FIG. 19 is dilated in step 112 to form a new mask 50, which is shown in FIG. 20, and this mask 50 is superimposed on the detected edge image in step 113 as shown in FIG. 21. The new mask 50 is used to crop away clutter in step 114 to obtain an even better image as shown in FIG. 22.

Figure 22:
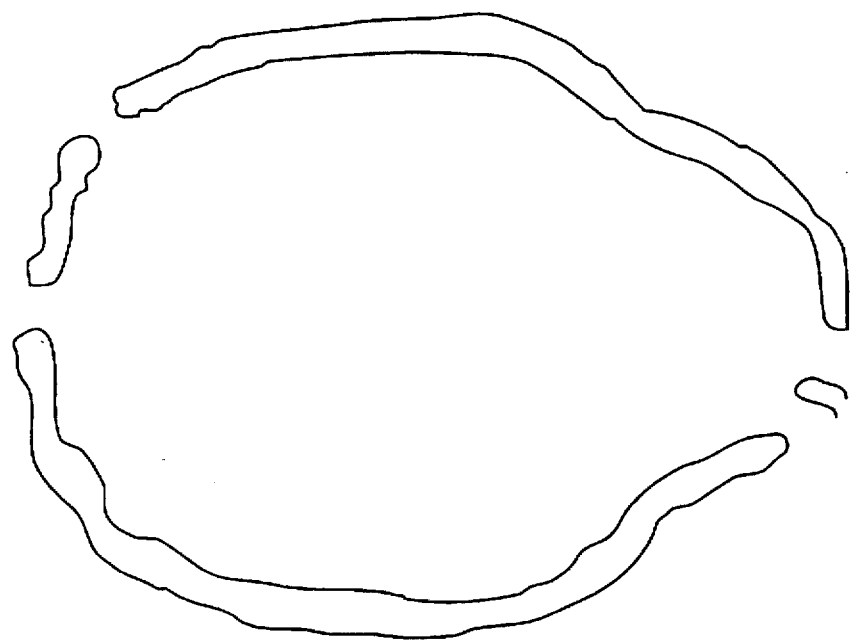
FIG. 22 shows resulting cropped image from FIG. 21.
Figure 23:
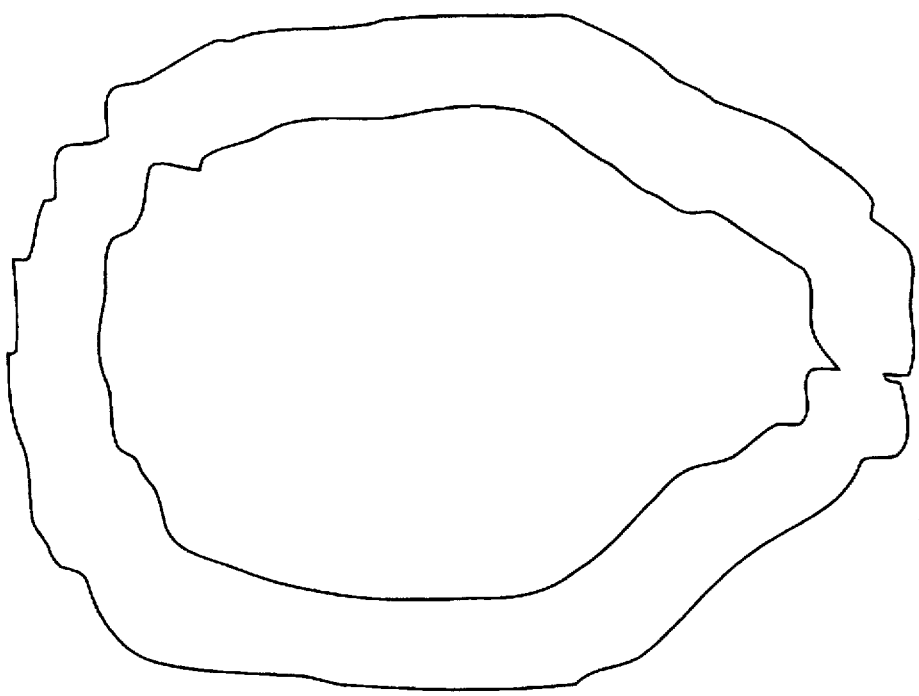
FIG. 23 shows the dilated image from FIG. 22.
Figure 24:
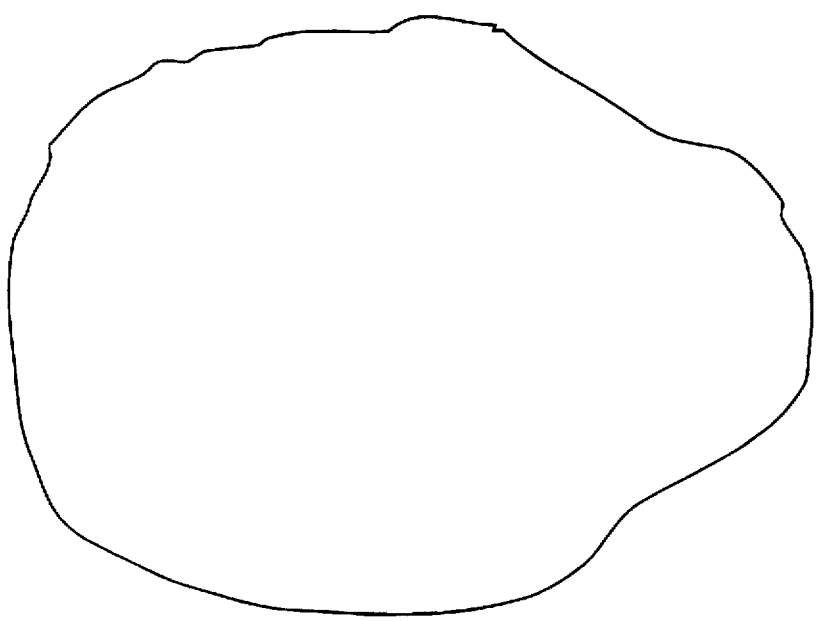
FIG. 24 shows the single pixel outline formed from shrinking the image of FIG. 23.

The image shown in FIG. 22 is dilated in step 115 to form a closed outline to produce the image shown in FIG. 23 and this image is shrunk in step 116 to a one pixel outline as shown in FIG. 24.

Figure 25:
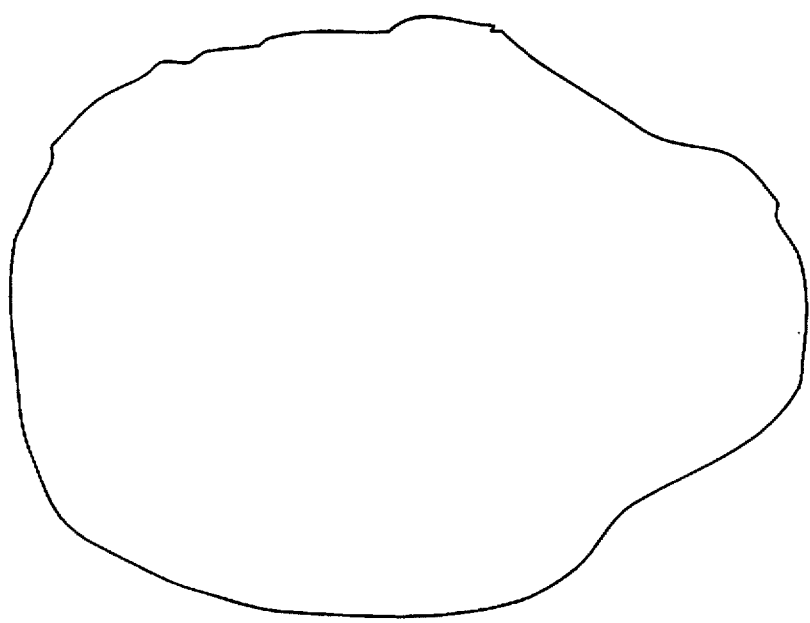
FIG. 25 shows the outline obtained after repeated interactions.
Figure 26:
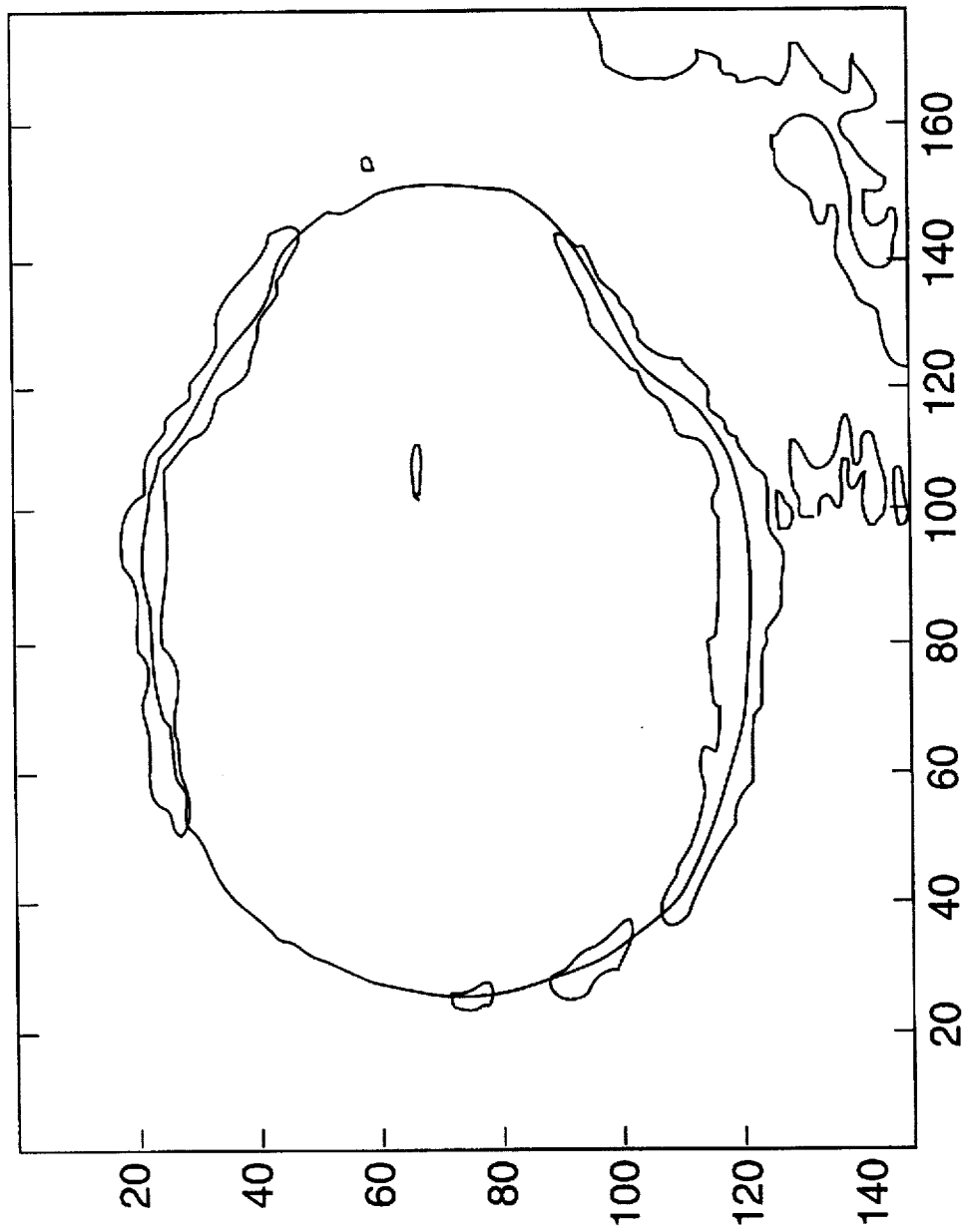
FIG. 26 shows the outline of FIG. 25 superimposed on the image of FIG. 9.

In step 117, the outline processor compares the outline of FIG. 24 with the outline obtained in FIG. 19 to determine if there are significant changes. If so, the process is repeated from steps 112–118 until no significant change in the outline is achieved and the resulting outline shown in FIG. 25 is obtained. FIG. 26 shows the outline of FIG. 25 on the originally cropped image of FIG. 9 to show that an extremely faithful outline can be achieved. The image processing carried out in these steps is available as the tool "bwmorph" in MATLAB 4.1 and in particular the operators clean, dilate, shrink, skel and spur.

The outline shown in FIG. 26 is the final result achieved by the outline processor 14 and this is evaluated by the outline evaluator 16 in microprocessor 11 by using the radius of curvature values thereof in step 119 to produce a measurement of the shape of the outline of FIG. 25.

Figure 7:
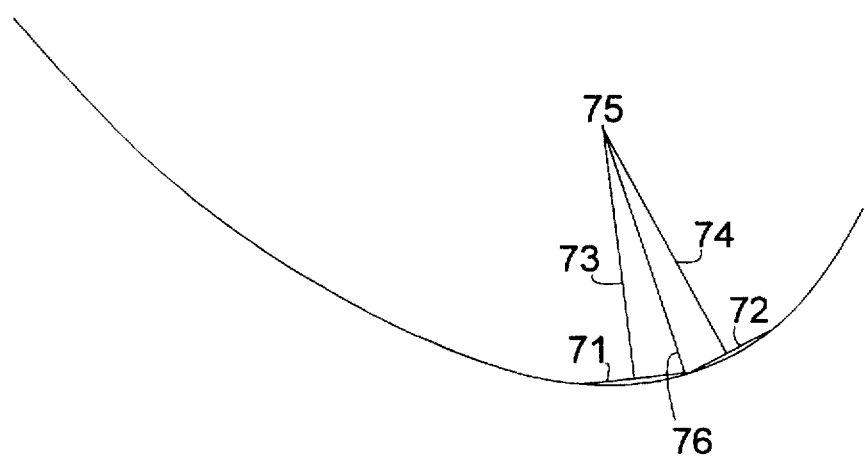
FIG. 7 shows the determination of the curvature of a shape according to the present invention.

As shown in FIG. 7, the outline evaluator determines the perpendicular bisectors 73, 74 of secants 71, 72 to obtain the radius of curvature 76. The radius of curvature is a good measure of the shape of the curve at each discrete point. To characterize the shape of the curve as a whole, all of the radius of curvature values from the entire outline are evaluated and transformed by taking the inverse thereof to obtain curvature values, which define a more well behaved function.

Figure 27:
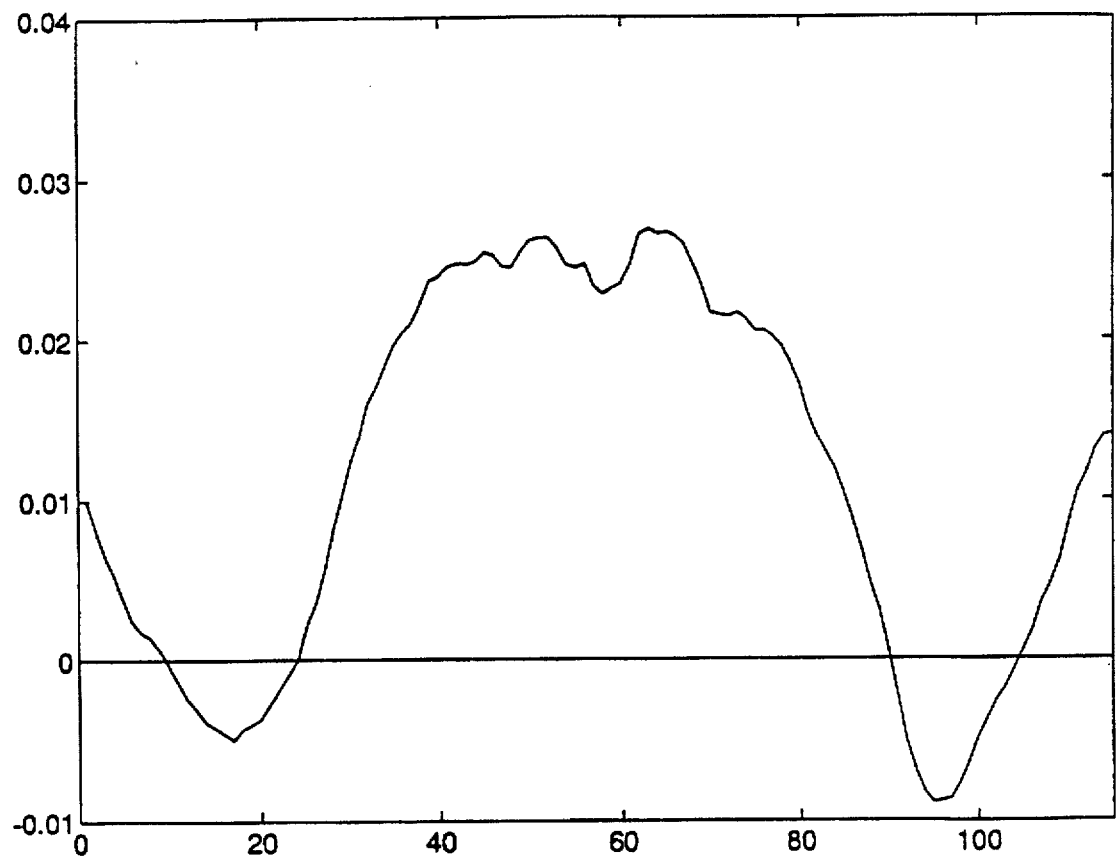
FIG. 27 shows a graph of the calculated curvature values.

The curvature values determined for each point on the outline are plotted in FIG. 27. Curvature is determined first by discarding the rear half of the outline pixels, normalizing the outline size and smoothing the outline. The data shown in FIG. 27 is the result of that processing. The measure of the outline is the portion below a threshold value, which was chosen to be 0.005. The outline evaluator measures the area of the curvature function below that threshold value to determine a single figure of merit. These computations are carried out in the arithmetic unit of the microcomputer in a preferred embodiment of the invention. This figure of merit is compared to values for others in the population in step 120. It should be noted that the dips in the curves shown in FIG. 27 correspond to the portions of the fetal skull which go from convex to concave and which constitutes the "lemon shape" which is an indicator of spina bifida.

Figure 28:
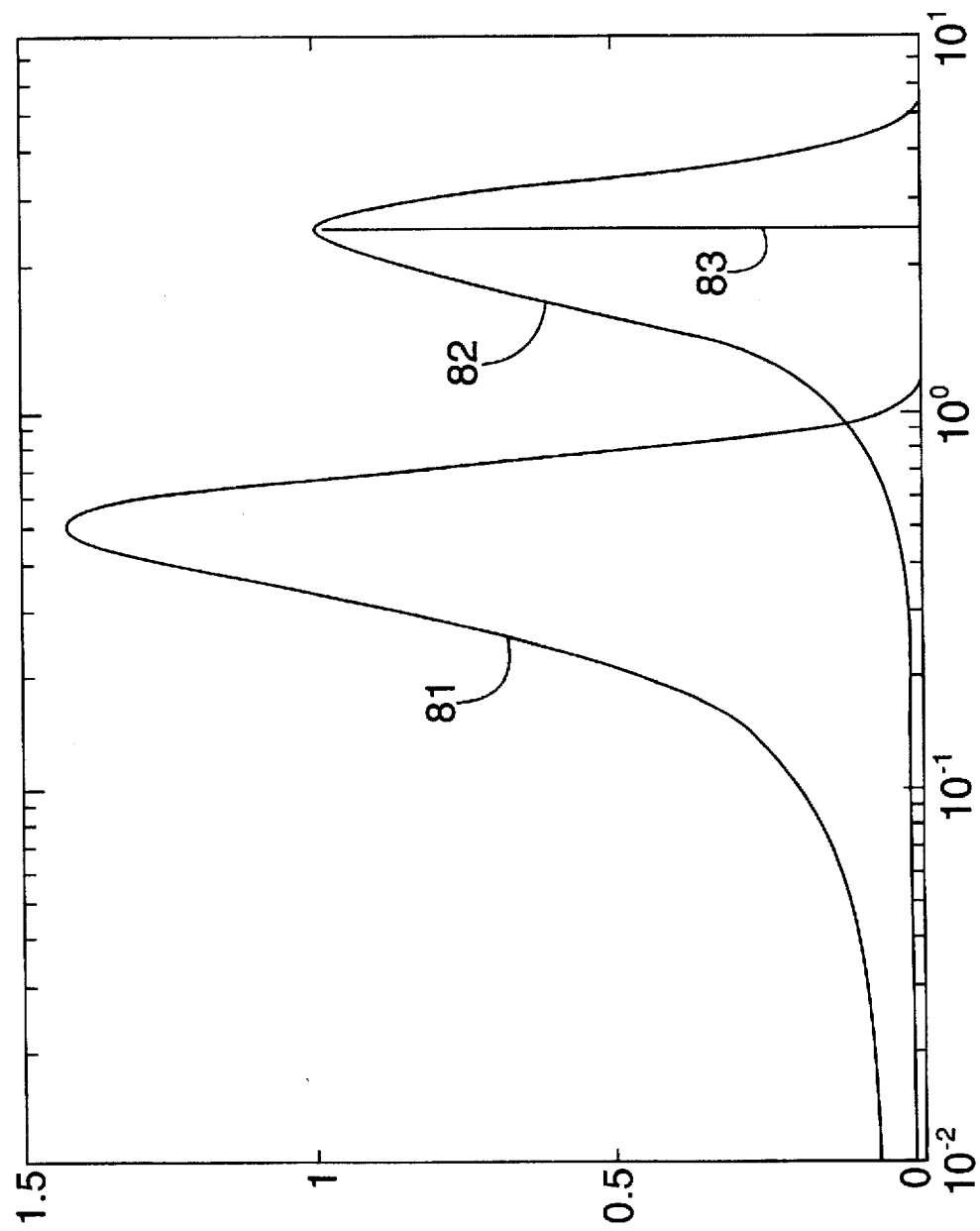
FIG. 28 shows the plot of a measure from the data of FIG. 27 against statistical distributions of unaffected and affected populations.

FIG. 28 shows the distributions 81 and 82 for unaffected and affected populations plotted versus the area below the threshold shown in FIG. 27. In the case of the graphical results shown in FIG. 27, the value shown as line 83 clearly falls within the affected population with absolutely no crossing of the unaffected population distribution curve. Risk is calculated in step 121 from the portions of line 83 that intersect the two distributions. As a result, the calculated individual risk is close to 100%, and the outline evaluator would then inform the user in step 121 of such a risk.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

In this regard, standard masks relating to the study of other body parts can be stored in memory. For example, a mask to isolate the nuchal fold of a fetus would, after similar iterations, allow measurements to a one pixel precision which is important for the detection of Down Syndrome.

Because of the iteration method, the present invention is not limited to the analysis of shapes for which masks are stored in memory. If sufficient marks are inserted into the image for identification of a target shape, the method and system of the present invention can interpolate them to form a continuous curve and produce a concentric curve or curves which include the image part of interest. Using these curves as boundaries, a first rough mask can be formed for starting the iteration process.

The method and system of the present invention can be used with images created by MRI, PET, CT, X-ray, ultrasound and other imaging systems. The method and system can be used in fields other than for medical analysis, for instance, image processing and analysis of astronomical, geographical, geological and military images produced by satellites or the like.

What is claimed is:

1. A method for processing a digital image of an object, comprising the steps of:

forming a single pixel image outline of an object by a) superimposing a mask over edges of the object to crop away image portions outside the mask;

b) forming a first single pixel outline from the remaining image portions;

c) creating a new mask from the first single pixel outline;

d) superimposing the new mask over edges of the object in the image to crop away image portions outside the mask;

e) forming a second single pixel outline from the remaining image portions;

f) comparing the second outline to the first outline for changes; and g) repeating steps c) to f) until the changes are below a preselected number and producing at least one single number measure of the outline shape.

2. The method according to claim 1, wherein the step of forming a single pixel outline from remaining image portions comprises dilating the remaining image portions to form a closed outline and shrinking the dilated image to a single pixel outline.

3. A method for processing a digital image of an object, comprising the steps of:

forming a single pixel image outline of an object by applying an oversized mask over edges of the object image;

incrementally shrinking the mask and counting the number of pixels uncovered thereby;

selecting the incrementally shrunk mask having the minimum pixel count change;

superimposing the selected mask on the object to crop the object;

dilating the cropped object to form a closed outline and shrinking the closed outline to single pixel outline; and producing at least one single number measure of the outline shape.

4. A method for processing a digital image of an object, comprising the steps of:

a) superimposing a mask over edges of an object in an image to crop away image portions outside the mask;

b) forming a first single pixel outline from the remaining image portions;

c) creating a new mask from the first single pixel outline;

d) superimposing the new mask over edges of the object in the image to crop away image portions outside the mask;

e) forming a second single pixel outline from the remaining image portions;

f) comparing the second outline to the first outline for changes; and g) repeating steps c) to f) until the changes are below a preselected number.

5. The method according to claim 4, wherein the steps of forming a a single pixel outline from remaining image portions comprises dilating the remaining image portions to form a closed outline and shrinking the dilated image to a single pixel outline.

6. The method according to claim 4, wherein the step of superimposing a mask comprises:

applying an oversized mask over edges of the object image;

incrementally shrinking the mask and counting the number of pixels uncovered thereby;

selecting the incrementally shrunk mask having the minimum pixel count change; and superimposing the selected mask on the object to crop the object.

7. The method according to claim 6, further comprising dilating the cropped object to form a closed outline and shrinking the closed outline to a single pixel outline.

8. The method according to claim 4, further comprising the steps prior to superimposing a mask:

applying a band pass filter to the digital image of the object having an expected thickness range to remove image portions having pixel thicknesses above and below the expected thickness range; and edge detecting the remaining image portions to produce an outline of the object.

9. The method according to claim 8, wherein the band pass filter is underdamped to produce an overshoot and thereby a clear area around remaining image portions.

10. The method according to claim 4, further comprising thereafter:

measuring the radius of curvature of the outline at a plurality of sampling points, transforming the radius of curvature values to curvature values which are the inverse thereof;

plotting the curvature values;

computing the area of the plot of curvature values below a predetermined threshhold value; and assigning the computed area as a figure of merit for the outline.

11. The method according to claim 10, further comprising comparing the figure of merit to at least one distribution of figures of merit to determine a characteristic of the outline.

12. A method for processing a digital image of an object, comprising the steps of:

applying an oversized mask over edges of an object image wherein the mask has an inner edge and an outer edge;

incrementally shrinking the mask at the inner and outer edges thereof and counting the number of pixels uncovered thereby;

selecting the incrementally shrunk mask having the minimum pixel count change; and superimposing the selected mask on the object to crop the object.

13. The method according to claim 12, further comprising dilating the cropped object to form a closed outline and shrinking the closed outline to a single pixel outline.

14. The method according to claim 13, further comprising the steps of:

measuring the radius of curvature of the outline at a plurality of sampling points, transforming the radius of curvature values to curvature values which are the inverse thereof;

plotting the curvature values;

computing the area of the plot of curvature values below a predetermined threshhold value; and assigning the computed area as a figure of merit for the outline.

15. The method according to claim 14, further comprising comparing the figure of merit to at least one distribution of figures of merit to determine a characteristic of the outline.

16. The method according to claim 12, further comprising obtaining the edges of the object by:

applying a band pass filter to the digital image of the object having an expected thickness range to remove image portions having pixel thicknesses above and below the expected thickness range; and edge detecting the remaining image portions to produce an outline of the object.

17. The method according to claim 16, wherein the band pass filter is underdamped to produce an overshoot and thereby a clear area around remaining image portions.

18. A method for processing an ultrasonic image of a fetal skull to determine the probability of spina bifida, comprising the steps of:

a) marking four points on a fetal skull image corresponding to intersections with major and minor axes of an ellipse;

b) applying a band pass filter to the fetal skull image having an expected thickness range to remove image portions having pixel thicknesses above and below the expected thickness range;

c) edge detecting the remaining image portions to produce an outline of the fetal skull;

d) applying an oversized elliptical mask over edges of the fetal skull image aligned with the four points;

e) incrementally shrinking the mask and counting the number of pixels uncovered thereby;

f) selecting the incrementally shrunk mask having the minimum pixel count change;

g) superimposing the selected mask on the fetal skull image to crop same;

h) dilating the cropped fetal skull image to form a closed outline and shrinking the closed outline to a single pixel outline;

i) dilating the single pixel outline to form a new elliptical mask;

j) superimposing the new mask over edges of the fetal skull image to crop away image portions outside the mask;

k) forming a second single pixel outline from the remaining image portions;

l) comparing the second outline to the first outline for changes;

m) repeating steps i) to l) until the changes are below a preselected number; and n) producing a measure of the outline shape as a single number.

19. The method according to claim 18, wherein the steps of forming a a single pixel outline from remaining image portions comprises dilating the remaining image portions to form a closed outline and shrinking the dilated image to a single pixel outline.

20. The method according to claim 18, wherein the step of producing a measure comprises the steps of:

measuring the radius of curvature of the outline at a plurality of sampling points, transforming the radius of curvature values to curvature values which are the inverse thereof;

plotting the curvature values;

computing the area of the plot of curvature values below a predetermined threshhold value; and assigning the computed area as a figure of merit for the outline.

21. The method according to claim 20, further comprising comparing the figure of merit to at least one distribution of figures of merit to determine risk of spina bifida.

22. The method according to claim 18, wherein the band pass filter is underdamped to produce an overshoot and thereby a clear area around remaining image portions.

23. A system for processing a digital image of an object comprising:

means for forming a single pixel image outline of an object in a digital image comprising a) means for superimposing a mask over edges of the object to crop away image portions outside the mask;

b) means for forming a first single pixel outline from the remaining image portions;

c) means for creating a new mask from the first single pixel outline;

d) means for superimposing the new mask over edges of the object in the image to crop away image portions outside the mask;

e) means for forming a second single pixel outline from the remaining image portions;

f) means for comparing the second outline to the first outline for changes; and g) means for repeating the formation of new outlines until the changes are below a preselected number; and means for producing at least one single number measure of the outline shape.

24. The system according to claim 23, wherein the means for forming a a single pixel outline from remaining image portions comprises means for dilating the remaining image portions to form a closed outline and shrinking the dilated image to a single pixel outline.

25. A system for processing a digital image of an object, comprising:

means for forming a single pixel image outline of an object comprising:

means for applying an oversized mask over edges of the object image;

means for incrementally shrinking the mask and counting the number of pixels uncovered thereby;

means for selecting the incrementally shrunk mask having the minimum pixel count change;

means for superimposing the selected mask on the object to crop the object;

means for dilating the cropped object to form a closed outline and shrinking the closed outline to a single pixel outline; and means for producing at least one single number measure of the outline shape.

26. A system for processing a digital image of an object, comprising:

a) means for superimposing a mask over edges of an object in an image to crop away image portions outside the mask;

b) means for forming a first single pixel outline from the remaining image portions;

c) means for creating a new mask from the first single pixel outline;

d) means for superimposing the new mask over edges of the object in the image to crop away image portions outside the mask;

e) means for forming a second single pixel outline from the remaining image portions;

f) means for comparing the second outline to the first outline for changes; and g) means for repeating the formation of new outlines until the changes are below a preselected number.

27. The system according to claim 26, wherein the means for forming a a single pixel outline from remaining image portions comprises means for dilating the remaining image portions to form a closed outline and shrinking the dilated image to a single pixel outline.

28. The system according to claim 26, wherein the means for superimposing a mask comprises:

means for applying an oversized mask over edges of an object image;

means for incrementally shrinking the mask and counting the number of pixels uncovered thereby;

means for selecting the incrementally shrunk mask having the minimum pixel count change; and means for superimposing the selected mask on the object to crop the object.

29. The system according to claim 28, further comprising means for dilating the cropped object to form a closed outline and shrinking the closed outline to a single pixel outline.

30. The system according to claim 26, further comprising:

means for applying a band pass filter to the digital image of the object having an expected thickness range prior to superimposing a mask to remove image portions having pixel thicknesses above and below the expected thickness range; and means for edge detecting the remaining image portions to produce an outline of the object.

31. The system according to claim 30, wherein the band pass filter is underdamped to produce an overshoot and thereby a clear area around remaining image portions.

32. The system according to claim 26, further comprising:

means for measuring the radius of curvature of the outline at a plurality of sampling points, means for transforming the radius of curvature values to curvature values which are the inverse thereof;

means for plotting the curvature values;

means for computing the area of the plot of curvature values below a predetermined threshhold value; and means for assigning the computed area as a figure of merit for the outline.

33. The system according to claim 32, further comprising means for comparing the figure of merit to at least one distribution of figures of merit to determine a characteristic of the outline.

34. A system for processing a digital image of an object, comprising:

means for applying an oversized mask over edges of an object image, wherein the mask has an inner edge and an outer edge;

means for incrementally shrinking the mask at the inner and outer edges thereof and counting the number of pixels uncovered thereby;

means for selecting the incrementally shrunk mask having the minimum pixel count change; and means for superimposing the selected mask on the object to crop the object.

35. The system according to claim 34, further comprising means for dilating the cropped object to form a closed outline and shrinking the closed outline to a single pixel outline.

36. The system according to claim 35, further comprising:

means for measuring the radius of curvature of the outline at a plurality of sampling points, means for transforming the radius of curvature values to curvature values which are the inverse thereof;

means for plotting the curvature values;

means for computing the area of the plot of curvature values below a predetermined threshhold value; and means for assigning the computed area as a figure of merit for the outline.

37. The system according to claim 36, further comprising means for comparing the figure of merit to at least one distribution of figures of merit to determine a characteristic of the outline.

38. The system according to claim 34, further comprising means for obtaining the edges of the object including means for applying a band pass filter to the digital image of the object having an expected thickness range to remove image portions having pixel thicknesses above and below the expected thickness range; and means for edge detecting the remaining image portions to produce an outline of the object.

39. The system according to claim 38, wherein the band pass filter is underdamped to produce an overshoot and thereby a clear area around remaining image portions.

40. A system for processing an ultrasonic image of a fetal skull to determine the probability of spina bifida, comprising:

a) means for marking four points on a fetal skull image corresponding to intersections with major and minor axes of an ellipse;

b) means for applying a band pass filter to the fetal skull image having an expected thickness range to remove image portions having pixel thicknesses above and below the expected thickness range;

c) means for edge detecting the remaining image portions to produce an outline of the fetal skull;

d) means for applying an oversized elliptical mask over edges of the fetal skull image;

e) means for incrementally shrinking the mask and counting the number of pixels uncovered thereby;

f) means for selecting the incrementally shrunk mask having the minimum pixel count change;

g) means for superimposing the selected mask on the fetal skull image to crop same;

h) means for dilating the cropped fetal skull image to form a closed outline and shrinking the closed outline to a single pixel outline;

i) means for dilating the single pixel outline to form a new elliptical mask;

j) means for superimposing the new mask over edges of the fetal skull image to crop away image portions outside the mask;

k) means for forming a second single pixel outline from the remaining image portions;

l) means for comparing the second outline to the first outline for changes;

m) means for repeating the formation of new outlines until the changes are below a preselected number; and n) means for producing a measure of the outline shape as a single number.

41. The system according to claim 40, wherein the means for forming a a single pixel outline from remaining image portions comprises means for dilating the remaining image portions to form a closed outline and shrinking the dilated image to a single pixel outline.

42. The system according to claim 40, wherein the means for producing a measure comprises:

means for measuring the radius of curvature of the outline at a plurality of sampling points, means for transforming the radius of curvature values to curvature values which are the inverse thereof;

means for plotting the curvature values;

means for computing the area of the plot of curvature values below a predetermined threshhold value; and means for assigning the computed area as a figure of merit for the outline.

43. The system according to claim 42, further comprising means for comparing the figure of merit to at least one distribution of figures of merit to determine risk of spina bifida.

44. The system according to claim 40, wherein the band pass filter is underdamped to produce an overshoot and thereby a clear area around remaining image portions.

* * * * *